United States Patent
Liu et al.

(10) Patent No.: US 12,501,440 B2
(45) Date of Patent: Dec. 16, 2025

(54) INFORMATION TRANSMISSION METHOD AND COMMUNICATIONS APPARATUS

(71) Applicant: HUAWEI TECHNOLOGIES CO., LTD., Shenzhen (CN)

(72) Inventors: Xianda Liu, Beijing (CN); Kunpeng Liu, Beijing (CN); Xu Zhang, Beijing (CN); Xiang Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 486 days.

(21) Appl. No.: 17/371,576

(22) Filed: Jul. 9, 2021

(65) Prior Publication Data

US 2021/0345308 A1 Nov. 4, 2021

Related U.S. Application Data

(63) Continuation of application No. PCT/CN2020/071361, filed on Jan. 10, 2020.

(30) Foreign Application Priority Data

Jan. 11, 2019 (CN) .......................... 201910028849.2

(51) Int. Cl.
*H04W 72/23* (2023.01)
*H04L 1/00* (2006.01)
*H04L 5/00* (2006.01)

(52) U.S. Cl.
CPC .................................. *H04W 72/23* (2023.01)

(58) Field of Classification Search
CPC ...................................................... H04W 72/23
USPC .......................................................... 370/329
See application file for complete search history.

(56) References Cited

U.S. PATENT DOCUMENTS

| | | | |
|---|---|---|---|
| 2010/0303011 A1* | 12/2010 | Pan .................... | H04L 5/001 370/328 |
| 2017/0290046 A1* | 10/2017 | Sun .................... | H04W 72/0466 |
| 2018/0019843 A1* | 1/2018 | Papasakellariou .... | H04L 5/0091 |
| 2018/0048448 A1* | 2/2018 | Zhang .................. | H04W 24/10 |

(Continued)

FOREIGN PATENT DOCUMENTS

| | | |
|---|---|---|
| CA | 3057730 A1 | 9/2018 |
| CN | 105637959 A | 6/2016 |

(Continued)

OTHER PUBLICATIONS

3GPP TS 38.213 V15.3.0 (Sep. 2018), 3rd Generation Partnership Project; Technical Specification Group Radio Access Network; NR; Physical layer procedures for control (Release 15); 101 total pages.

(Continued)

*Primary Examiner* — Xuan Lu
(74) *Attorney, Agent, or Firm* — Rimon PC

(57) ABSTRACT

This application provides an information transmission method and a communications apparatus. The method includes: determining a correspondence between a first aggregation level (AL) set associated with a plurality of first physical downlink control channel (PDCCH) candidates and a second AL set associated with a plurality of second PDCCH candidates; and monitoring at least one of the plurality of first PDCCH candidates and/or at least one of the plurality of second PDCCH candidates based on the correspondence.

20 Claims, 16 Drawing Sheets

(56) References Cited

U.S. PATENT DOCUMENTS

2020/0229216 A1* 7/2020 Zhu .................. H04W 72/0446
2021/0037506 A1* 2/2021 Yoshimura ............ H04L 5/0091

FOREIGN PATENT DOCUMENTS

| CN | 108282291 A | 7/2018 |
| CN | 108365913 A | 8/2018 |
| EP | 3461221 A1 | 3/2019 |
| KR | 20180081464 A | 7/2018 |
| WO | 2017023422 A1 | 2/2017 |
| WO | 2020018268 A1 | 1/2020 |

OTHER PUBLICATIONS

3GPP TS 38.331 V15.3.0 (Sep. 2018), 3rd Generation Partnership Project; Technical Specification Group Radio Access Network; NR; Radio Resource Control (RRC) protocol specification (Release 15); 445 total pages.
Spreadtrum Communications: Discussion on Multi-TRP transmission 3GPP Draft; R1-1813066,Nov. 11, 2018, XP051555049, total 4 pages.

* cited by examiner

INFORMATION TRANSMISSION METHOD AND COMMUNICATIONS APPARATUS

CROSS-REFERENCE TO RELATED APPLICATIONS

This application is a continuation of International Application No. PCT/CN2020/071361, filed on Jan. 10, 2020, which claims priority to Chinese Patent Application No. 201910028849.2, filed on Jan. 11, 2019. The disclosures of the aforementioned applications are hereby incorporated by reference in their entireties.

TECHNICAL FIELD

This application relates to the communications field, and more specifically, to an information transmission method and a communications apparatus.

BACKGROUND

In a coordinated multipoint transmission/reception mode, a terminal device needs to monitor a plurality of pieces of downlink control information (DCI) in one monitoring periodicity. When monitoring DCI, the terminal device performs blind detection on the DCI on a plurality of physical downlink control channel (PDCCH) candidates. Due to a limitation of a capability of the terminal device, a quantity of PDCCH candidates that can be monitored by the terminal device when the terminal device performs blind detection on PDCCH candidates is limited. When the terminal device needs to monitor a plurality of pieces of DCI, the terminal device needs to separately perform blind detection on the DCI at all possible PDCCH candidate locations of the plurality of pieces of DCI. Complexity of performing blind detection on the DCI by the terminal device is relatively high. How to reduce complexity of blind detection on a plurality of pieces of DCI becomes an issue that urgently needs to be addressed.

SUMMARY

This application provides an information transmission method, to reduce a quantity of times of blind detection on DCI, and reduce complexity of blind detection on DCI. Further, communication efficiency and communication resource utilization are improved.

According to a first aspect, an information transmission method is provided. The method may be performed by a terminal device or by a chip used in a terminal device. The method includes: determining a correspondence between a first aggregation level AL set associated with a plurality of first downlink control channel PDCCH candidates and a second AL set associated with a plurality of second PDCCH candidates, where the correspondence is a correspondence between at least one first AL in the first AL set and at least one second AL in the second AL set; and monitoring at least one of the plurality of first PDCCH candidates and/or at least one of the plurality of second PDCCH candidates based on the correspondence.

In the information transmission method provided in the first aspect, when monitoring a plurality of pieces of DCI, the terminal device may determine, based on a correspondence between ALs corresponding to the plurality of pieces of DCI, an AL corresponding to DCI that needs to be monitored, and then monitor the DCI on a PDCCH candidate corresponding to the AL, without monitoring the DCI on PDCCH candidates corresponding to all possible ALs of each piece of DCI. Therefore, a quantity of times of blind detection on the DCI can be reduced, and complexity of blind detection on the DCI is reduced. Further, communication efficiency and communication resource utilization are improved.

In a possible implementation of the first aspect, the correspondence is a correspondence between at least one first AL in the first AL set and at least one second AL in the second AL set, and the monitoring at least one first PDCCH candidate in the plurality of PDCCH candidate sets and/or at least one second PDCCH candidate in the plurality of PDCCH candidate sets based on the correspondence includes: determining a third AL of a third PDCCH candidate in the plurality of first PDCCH candidates, where the third AL belongs to the first AL set; determining at least one fourth AL based on the correspondence, where the at least one fourth AL is one or more values in the second AL set; and monitoring a fourth PDCCH candidate associated with the at least one fourth AL, where the fourth PDCCH candidate is at least one of the plurality of second PDCCH candidates.

In a possible implementation of the first aspect, the correspondence is a correspondence between at least one second AL in the second AL set and at least one first AL in the first AL set, and the monitoring at least one first PDCCH candidate in the plurality of PDCCH candidate sets and/or at least one second PDCCH candidate in the plurality of PDCCH candidate sets based on the correspondence includes: determining a fifth AL of a fifth PDCCH candidate in the plurality of second PDCCH candidates, where the fifth AL is one value in the second AL set; determining at least one sixth AL based on the correspondence, where the at least one sixth AL is one or more values in the first AL set; and
    monitoring a sixth PDCCH candidate associated with the at least one sixth AL, where the sixth PDCCH candidate is at least one of the plurality of first PDCCH candidates.

In a possible implementation of the first aspect, a monitor occasion of the third PDCCH candidate is earlier than that of the plurality of second PDCCH candidates, or a monitor occasion of the fifth PDCCH candidate is earlier than that of the plurality of first PDCCH candidates.

In a possible implementation of the first aspect, the correspondence includes at least one of the following: one first AL in the first AL set corresponds to one second AL in the second AL set, one first AL in the first AL set corresponds to a plurality of second ALs in the second AL set, a plurality of first ALs in the first AL set correspond to a plurality of second ALs in the second AL set, one second AL in the second AL set corresponds to one first AL in the first AL set, and one second AL in the second AL set corresponds to a plurality of first ALs in the first AL set.

In a possible implementation of the first aspect, the monitoring at least one of the plurality of first PDCCH candidates and/or at least one of the plurality of second PDCCH candidates based on the correspondence includes: monitoring first DCI on the at least one of the plurality of first PDCCH candidates, and monitoring second DCI on the at least one of the plurality of second PDCCH candidates. The first DCI is used to schedule first data, and the second DCI is used to schedule second data.

In a possible implementation of the first aspect, the first data and the second data are located on a same carrier or a same bandwidth part, and/or the first DCI and the DCI are located on a same carrier or a same bandwidth part.

In a possible implementation of the first aspect, the plurality of first PDCCH candidates correspond to a first time-frequency resource set, the plurality of second PDCCH candidates correspond to a second time-frequency resource set, the first DCI is carried on the first time-frequency resource set, the second DCI is carried on the second time-frequency resource set, and the monitoring at least one of the plurality of first PDCCH candidates and/or at least one of the plurality of second PDCCH candidates based on the correspondence includes: monitoring the first DCI on the first time-frequency resource set, and monitoring the second DCI on the second time-frequency resource set. The first time-frequency resource set and the second time-frequency resource set are located on a same carrier or a same bandwidth part, and/or the first DCI and the DCI are located on a same carrier or a same bandwidth part.

In a possible implementation of the first aspect, the method further includes: receiving configuration information. The configuration information includes at least one of the correspondence, a first search space set, a first control resource set, a second search space set, and a second control resource set. Configuration information of the first search space set includes indication information of the first AL set. Configuration information of the second search space set includes indication information of the second AL set. The first control resource set includes time-frequency resource configuration information of the plurality of first PDCCH candidates. The second control resource set includes time-frequency resource configuration information of the plurality of second PDCCH candidates.

In a possible implementation of the first aspect, index values of the first control resource set and the second control resource set are different.

In a possible implementation of the first aspect, a first receive beam for receiving the first DCI on the first control resource set is different from a second receive beam for receiving the second DCI on the second control resource set.

In a possible implementation of the first aspect, the first AL set and/or the second AL set include/includes at least one of 1, 2, 4, 8, and 16.

In a possible implementation of the first aspect, a first AL of the first DCI is the same as a second AL of the second DCI, an information bit length of the first DCI is the same as that of the second DCI, and the method further includes: jointly decoding the first DCI and the second DCI.

In a possible implementation of the first aspect, a first AL of the first DCI is the same as a second AL of the second DCI, control information indicated by the first DCI is the same as that indicated by the second DCI, and the method further includes: jointly decoding the first DCI and the second DCI.

In a possible implementation of the first aspect, the jointly decoding the first DCI and the second DCI includes: determining a quantity of monitored PDCCH candidates in a first monitoring time unit. A quantity of monitored PDCCH candidates corresponding to a PDCCH candidate quantity X of the first DCI and a PDCCH candidate quantity Y of the second DCI is less than X+Y.

In a possible implementation of the first aspect, a first AL of the first DCI is different from a second AL of the second DCI, and the method further includes: separately decoding the first DCI and the second DCI.

In a possible implementation of the first aspect, the separately decoding the first DCI and the second DCI includes: determining a quantity of monitored PDCCH candidates in a first monitoring time unit. A quantity of monitored PDCCH candidates corresponding to a PDCCH candidate quantity X of the first DCI and a PDCCH candidate quantity Y of the second DCI is equal to X+Y.

According to a second aspect, an information transmission method is provided. The method may be performed by a network device or by a chip used in a network device. The method includes: determining a correspondence between a first aggregation level AL set associated with a first downlink control channel PDCCH candidate set and a second AL set associated with a plurality of second PDCCH candidates, where the correspondence is a correspondence between at least one first AL in the first AL set and at least one second AL in the second AL set; and based on the correspondence, sending first downlink control information DCI on at least one of the plurality of first PDCCH candidates, and/or sending second DCI on at least one of the plurality of second PDCCH candidates.

In the information transmission method provided in the second aspect, when a plurality of pieces of DCI are sent, an AL corresponding to DCI that needs to be sent may be determined based on a correspondence between ALs corresponding to the plurality of pieces of DCI, and then the DCI is sent on a PDCCH candidate corresponding to the AL. Therefore, a quantity of times of blind detection on the DCI can be reduced, and complexity of blind detection on the DCI is reduced. Further, communication efficiency and communication resource utilization are improved.

In a possible implementation of the second aspect, the correspondence is a correspondence between at least one first AL in the first AL set and at least one second AL in the second AL set, and the sending first DCI and/or second DCI based on the correspondence includes: determining a third AL corresponding to a third PDCCH candidate for sending the first DCI, where the third AL is one value in the first AL set; determining at least one fourth AL based on the correspondence, where the at least one fourth AL is one value in the second AL set; and sending the second DCI on a fourth PDCCH candidate associated with the at least one fourth AL, where the fourth PDCCH candidate is at least one of the plurality of second PDCCH candidates.

In a possible implementation of the second aspect, the correspondence is a correspondence between at least one second AL in the second AL set and at least one first AL in the first AL set, and the sending first DCI and/or second DCI based on the correspondence includes: determining a fifth AL corresponding to a fifth PDCCH candidate for sending the second DCI, where the fifth AL is one value in the second AL set; determining at least one sixth AL based on the correspondence, where the at least one sixth AL is one value in the first AL set; and sending the first DCI on a sixth PDCCH candidate associated with the at least one sixth AL, where the sixth PDCCH candidate is at least one of the plurality of first PDCCH candidates.

In a possible implementation of the second aspect, an occasion for sending the first DCI is earlier than that for sending the second DCI, or an occasion for sending the second DCI is earlier than that for sending the first DCI.

In a possible implementation of the second aspect, the first AL set and the second AL set each include at least one value, and the correspondence includes at least one of the following: one first AL in the first AL set corresponds to one second AL in the second AL set, one first AL in the first AL set corresponds to a plurality of second ALs in the second AL set, a plurality of first ALs in the first AL set correspond to a plurality of second ALs in the second AL set, one second AL in the second AL set corresponds to one first AL in the first AL set, and one second AL in the second AL set corresponds to a plurality of first ALs in the first AL set.

In a possible implementation of the second aspect, the first DCI is used to schedule first data, and the second DCI is used to schedule second data; and the first data and the second data are located on a same carrier or a same bandwidth part, and/or the first DCI and the DCI are located on a same carrier or a same bandwidth part.

In a possible implementation of the second aspect, the method further includes: sending configuration information. The configuration information includes at least one of the correspondence, a first search space set, a first control resource set, a second search space set, and a second control resource set. Configuration information of the first search space set includes indication information of the first AL set. Configuration information of the second search space set includes indication information of the second AL set. The first control resource set includes time-frequency resource configuration information of the plurality of first PDCCH candidates. The second control resource set includes time-frequency resource configuration information of the plurality of second PDCCH candidates.

In a possible implementation of the second aspect, index values of the first control resource set and the second control resource set are different.

In a possible implementation of the second aspect, a first transmit beam for sending the first DCI on the first control resource set is different from a second transmit beam for sending the second DCI on the second control resource set.

In a possible implementation of the second aspect, the first AL set and/or the second AL set include/includes at least one of 1, 2, 4, 8, and 16.

In a possible implementation of the second aspect, a first AL of the first DCI is the same as a first AL of the second DCI, an information bit length of the first DCI is the same as that of the second DCI, and the method further includes: jointly encoding the first DCI and the second DCI.

In a possible implementation of the second aspect, a first AL of the first DCI is the same as a first AL of the second DCI, control information indicated by the first DCI is the same as that indicated by the second DCI, and the method further includes: jointly encoding the first DCI and the second DCI.

In a possible implementation of the second aspect, a first AL of the first DCI is different from a first AL of the second DCI, and the method further includes: separately encoding the first DCI and the second DCI.

According to a third aspect, a communications apparatus is provided, including units configured to perform the steps of the method according to any one of the first aspect to the sixth aspect or the implementations of the first aspect to the sixth aspect.

In a design, the communications apparatus is a communications chip. The communications chip may include an input circuit or interface configured to send information or data, and an output circuit or interface configured to receive information or data.

In another design, the communications apparatus is a communications device (for example, a terminal device or a network device). A communications chip may include a transmitter configured to send information or data, and a receiver configured to receive information or data.

According to a fourth aspect, a terminal device is provided, including a transceiver, a processor, and a memory. The processor is configured to control the transceiver to send or receive a signal. The memory is configured to store a computer program. The processor is configured to invoke the computer program from the memory and run the computer program, so that the terminal device performs the method according to any one of the first aspect or the possible implementations of the first aspect. Optionally, there are one or more processors, and there are one or more memories.

Optionally, the memory may be integrated with the processor, or the memory and the processor are disposed separately.

According to a fifth aspect, a network device is provided, including a transceiver, a processor, and a memory. The processor is configured to control the transceiver to send or receive a signal. The memory is configured to store a computer program. The processor is configured to invoke the computer program from the memory and run the computer program, so that the network device performs the method according to any one of the second aspect or the possible implementations of the second aspect. Optionally, there are one or more processors, and there are one or more memories.

Optionally, the memory may be integrated with the processor, or the memory and the processor are disposed separately.

During specific implementation, for example, the processor may be configured to perform baseband-related processing, and a transmitter and a receiver may be configured to perform radio frequency sending and receiving respectively, but this does not constitute a limitation. The foregoing components may be separately disposed on chips independent of each other, or at least some or all of the components may be disposed on one chip. For example, the receiver and the transmitter may be disposed on a receiver chip and a transmitter chip that are independent of each other, or may be integrated into a transceiver and then disposed on a transceiver chip. For another example, the processor may be further divided into an analog baseband processor and a digital baseband processor. The analog baseband processor and the transceiver may be integrated on one chip, and the digital baseband processor may be disposed on an independent chip. With continuous development of integrated circuit technologies, an increasing quantity of components may be integrated on one chip. For example, the digital baseband processor and a plurality of application processors (for example, but not limited to a graphics processing unit and a multimedia processor) may be integrated on one chip. The chip may be referred to as a system-on-a-chip (system on chip). Whether to separately dispose the components on different chips or integrate the components on one or more chips depends on a specific product design requirement. Specific implementation forms of the foregoing components are not limited in this embodiment of this application.

According to a sixth aspect, a processor is provided, including an input circuit, an output circuit, and a processing circuit. The processing circuit is configured to receive a signal by using the input circuit, and transmit a signal by using the output circuit, so that the processor performs the method according to any one of the first aspect, the second aspect, or the possible implementations of the first aspect or the second aspect.

During specific implementation, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be output to, for example, but not limited to, a transmitter, and transmitted by the transmitter. In addition, the input circuit and the output circuit may be a same circuit, and the circuit serves as the input circuit and the output circuit at different occasions. Specific implementations of the processor and various circuits are not limited in this embodiment of this application.

According to a seventh aspect, a processing apparatus is provided, including a memory and a processor. The processor is configured to read instructions stored in the memory, and may receive a signal by using a receiver, and transmit a signal by using a transmitter, to perform the method according to any one of the first aspect, the second aspect, or the possible implementations of the first aspect or the second aspect.

Optionally, there are one or more processors, and there are one or more memories.

Optionally, the memory may be integrated with the processor, or the memory and the processor are disposed separately.

During specific implementation, the memory may be a non-transitory (non-transitory) memory, for example, a read-only memory (read only memory, ROM). The memory and the processor may be integrated on one chip, or may be separately disposed on different chips. A type of the memory and a manner of disposing the memory and the processor are not limited in this embodiment of this application.

According to an eighth aspect, a chip is provided, including a processor and a memory. The memory is configured to store a computer program. The processor is configured to invoke the computer program from the memory and run the computer program. The computer program is used to implement the method according to any one of the first aspect, the second aspect, or the possible implementations of the first aspect or the second aspect.

According to a ninth aspect, a computer program product is provided. The computer program product includes a computer program (which may also be referred to as code or an instruction). When the computer program runs, a computer is enabled to perform the method according to any one of the first aspect, the second aspect, or the possible implementations of the first aspect or the second aspect.

According to a tenth aspect, a computer-readable medium is provided. The computer-readable medium stores a computer program (which may also be referred to as code or instructions). When the computer program runs on a computer, the computer is enabled to perform the method according to any one of the first aspect, the second aspect, or the possible implementations of the first aspect or the second aspect.

DESCRIPTION OF EMBODIMENTS

Figure 1:
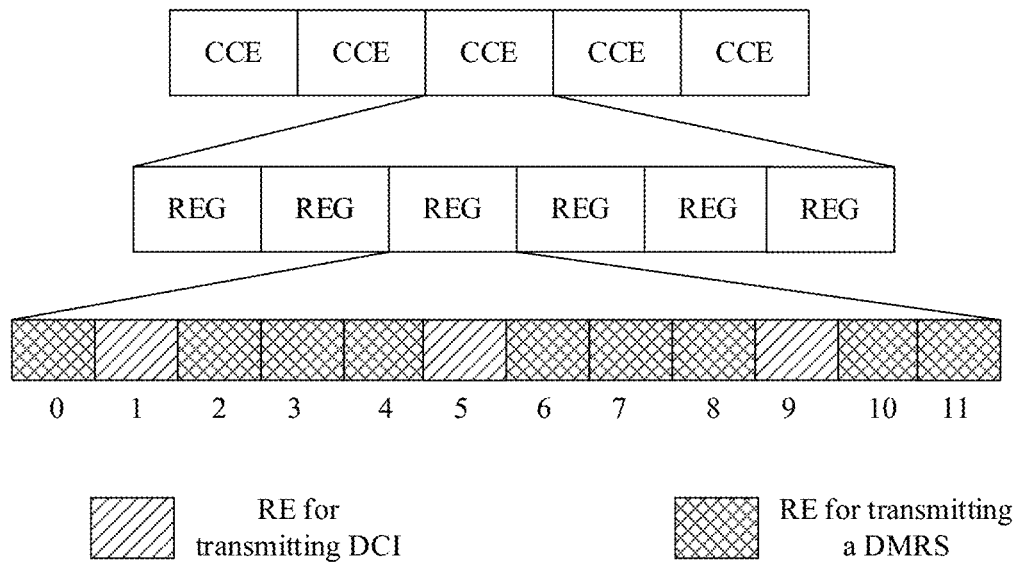
FIG. 1 is a schematic diagram of a time-frequency location relationship between a CORESET, a CCE, a REG, and a corresponding DMRS.

The following describes technical solutions of this application with reference to accompanying drawings.

The technical solutions of the embodiments of this application may be applied to various communications systems, such as: a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE)

system, an LTE frequency division duplex (frequency division duplex, FDD) system, an LTE time division duplex (time division duplex, TDD), a universal mobile telecommunication system (universal mobile telecommunication system, UMTS), a worldwide interoperability for microwave access (worldwide interoperability for microwave access, WiMAX) communications system, a future 5th generation (5th generation, 5G) system, or a new radio (new radio, NR) system.

A terminal device in the embodiments of this application may also be referred to as user equipment, an access terminal, a subscriber unit, a subscriber station, a mobile station, a remote station, a remote terminal, a mobile device, a user terminal, a terminal, a wireless communication device, a user agent, a user apparatus, or the like. The terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (public land mobile network, PLMN). This is not limited in the embodiments of this application.

A network device in the embodiments of this application may be a device configured to communicate with the terminal device. The network device may be a base transceiver station (base transceiver station, BTS) in a global system for mobile communications (global system for mobile communications, GSM) or code division multiple access (code division multiple access, CDMA), or may be a NodeB (NodeB, NB) in a wideband code division multiple access (wideband code division multiple access, WCDMA) system, or may be an evolved NodeB (evolved NodeB, eNB or eNodeB) in an LTE system, or may be a radio controller in a cloud radio access network (cloud radio access network, CRAN) scenario. Alternatively, the network device may be a relay station, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running at the hardware layer, and an application layer running at the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an entity for performing a method provided in the embodiments of this application is not particularly limited in the embodiments of this application, provided that the entity can run a program that records code of the method provided in the embodiments of this application to perform communication according to the method provided in the embodiments of this application. For example, the entity for performing the method provided in the embodiments of this application may be a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

In a long term evolution LTE, long term evolution-advanced (LTE-advanced, LTE-A), or NR system defined in the 3rd generation partnership project (3GPP), an orthogonal frequency division multiple access (OFDMA) mode is usually used as a downlink multiple access mode. A downlink resource is divided into a plurality of orthogonal frequency division multiplexing (OFDM) symbols in time (time domain), and is divided into a plurality of subcarriers in frequency (frequency domain). Some time-frequency resources in downlink are used to carry a physical downlink control channel (PDCCH). The PDCCH is used to carry downlink control information (downlink control information, DCI). The DCI is control information used by a network device to indicate user equipment (user equipment, UE) behavior at a physical layer. In addition, higher layer signaling may also be used by the network device to indicate UE behavior. The higher layer signaling is indication information, above the physical layer, that is used to control and manage related UE, for example, radio resource control (RRC) signaling. Some time-frequency resources in downlink are used to carry a physical downlink shared channel (PDSCH). The PDSCH is used to carry data exchanged between user equipment and the network device. The PDSCH is shared by all user equipments that access a network system.

In a time-frequency resource indication process, a granularity for representing a size of a system time-domain resource is a slot (slot). For a slot based frame structure (slot based frame structure), each slot includes 14 symbols. For a non-slot based frame structure (non-slot based frame structure), each slot may include two, four, or seven symbols. In addition, it is further specified that a granularity for representing a size of a system frequency-domain resource may be a resource block (resource block, RB). In some configuration cases, one RB includes 12 subcarriers in frequency domain, and bandwidth occupied by each subcarrier is 15 kHz. One or more symbols may be included in time domain. In the embodiments of this application, the symbol is also referred to as a time-domain symbol, and may be an orthogonal frequency division multiplexing (orthogonal frequency division multiplexing, OFDM) symbol or a single carrier frequency division multiple access (single carrier frequency division multiple access, SC-FDMA) symbol.

SC-FDMA is also referred to as orthogonal frequency division multiplexing with transform precoding (orthogonal frequency division multiplexing with transform precoding, OFDM with TP). It can be understood that, in the embodiments of the present invention, the granularity for representing a size of a system time-domain resource is not limited to the slot, and may be alternatively a subframe (Subframe), a transmission time interval, a mini-slot (mini-Slot), or the like.

Another common granularity for representing a size of a system time-frequency resource is a resource element (RE). Each RE includes one subcarrier in frequency domain, and includes one symbol in time domain. In addition, a granularity for representing a size of a system frequency-domain resource is a bandwidth part (BWP). The network device configures one or more BWPs for UE in a serving cell of the network device. Each BWP configuration includes a subcarrier spacing (subcarrier spacing) size parameter, a cyclic prefix, a quantity of consecutive physical resource blocks (PRB) occupied by the BWP, a starting location of the 1st PRB, and the like. These parameters are configured by the network device by using higher layer signaling. In addition, the network device further activates one or more BWPs based on the BWP configured by the network device, and the UE interacts and communicates with a base station based on the activated BWP.

Before transmitting data, the network device needs to indicate, by using DCI, the terminal device to receive data on a specific time-frequency resource in a specific receiving manner. Before the terminal device transmits data, the network device needs to indicate, by using DCI, the terminal device to send data on a specific time-frequency resource in a specific sending manner. An information bit of the DCI is transmitted to a channel encoding module, and rate matching is performed. Then a control information bit is modulated according to a specific criterion (for example, quadrature phase shift keying (quadrature phase shift keying, QPSK)), and is finally mapped to the time-frequency resource to form a PDCCH.

A time-frequency resource occupied by the PDCCH is usually configured by using higher layer signaling or a system message. In a configuration process, a control resource set (control-resource set, CORESET) is used as a configuration unit. All information bits (used to schedule the terminal device to receive a PDSCH or send a PUSCH) of the DCI indicated by the network device to the terminal device are carried on the PDCCH. Alternatively, this may be understood as that the information bits of the DCI are carried on the time-frequency resource occupied by the PDCCH. The CORESET may be understood as follows: Some specific time-frequency resources of time-frequency resources in a system are used to carry DCI signaling. The specific time-frequency resources are indicated to the terminal device in advance by using higher layer signaling, so that the terminal device may monitor DCI signaling on the specific time-frequency resources at subsequent specific monitor occasions. The control resource set includes information about the time-frequency resource occupied by the network device to send the PDCCH. The network device may configure one or more control resource sets for the terminal device. The network device may send the PDCCH to the terminal device on any control resource set corresponding to the terminal device.

One control resource set includes $N_{RB}^{CORESET}$ RBs in frequency domain, and a quantity and locations of included RBs are configured by using higher layer signaling. A frequency-domain resource configuration manner of the control resource set is indicated by using a bitmap (bitmap) at a granularity of six RBs. Usually, one CORESET is indicated in a segment of system bandwidth. In addition, the CORESET is usually defined in time domain as follows: One slot includes $N_{symb}^{CORESET}$ OFDM symbols, and a value of $N_{symb}^{CORESET}$ may be 1, 2, or 3. A quantity and a location of OFDM symbols included in one CORESET are configured by using higher layer signaling. For example, for scheduling at a slot (slot) level, the CORESET is usually located in the first three OFDM symbols of a slot; and for scheduling at a non-slot (non-slot) level (a scheduled time-domain resource is less than one slot), the CORESET may be at any location in a slot. A plurality of CORESETs may be configured for one terminal device, and an index number (index value) may be configured for each CORESET. A CORESET with an index value of 0 is usually used to carry a system message. CORESET index configuration information is also indicated by using a system message or higher layer signaling. Another CORESET is usually used to carry cell-common DCI (used to indicate a cell-common control message) or terminal device-specific DCI (for example, used to schedule a unicast (unicast) PDSCH or PUSCH). Each CORESET may be shared by a plurality of terminal devices in a serving cell (corresponding scheduling is implemented by the network device). The terminal devices that share the CORESET may receive, on a time-frequency resource indicated by the CORESET, the PDCCH sent by the network device, and send data to the network device based on the PDCCH, or receive, based on the PDCCH, data sent by the network device.

An optimal receive beam needs to be used for receiving the PDCCH to ensure signal receiving performance. In addition, for receiving the PDCCH, the network device further needs to send a corresponding demodulation reference signal (DMRS) to perform channel estimation. The terminal device can accurately receive control information on the PDCCH only through channel estimation. When channel estimation is performed based on the DMRS, some large-scale parameters such as a delay spread and a Doppler shift and information such as a receive beam are required. The receive beam and the large-scale parameters are collectively referred to as quasi-co-location (quasi-co-location) (QCL) information. The quasi-co-location information is usually configured in a CORESET configuration parameter. A beam pair (Beam pair link, BPL) is receive beam information. Different CORESETs corresponding to one terminal device may occupy different time-frequency resources and use different receive beams.

A CORESET time-frequency resource is further divided into a plurality of control channel elements (control channel elements, CCEs). One CCE corresponds to six resource element groups (resource element groups, REGs). One REG includes one physical resource block (physical resource block, PRB) in frequency domain, and includes one OFDM symbol in time domain. Each REG includes a plurality of resource elements (resource element, RE) used to transmit a DMRS. In one REG, frequency-domain density of a DMRS is uniformly ¼, that is, there is one RE of the DMRS in every four subcarriers (every four REs). FIG. 1 is a schematic diagram of a time-frequency location relationship between a CORESET, a CCE, a REG, and a corresponding DMRS. As shown in FIG. 1, a location of a DMRS in one REG may be an RE 1, an RE 5, and an RE 9.

Figure 2:
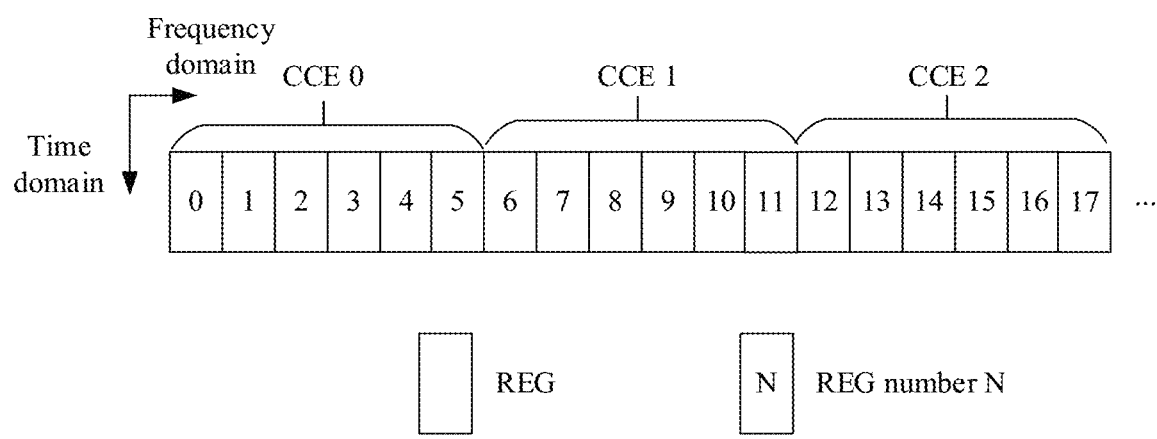
FIG. 2 is a schematic diagram of binding six REGs in frequency domain into one CCE.
Figure 3:
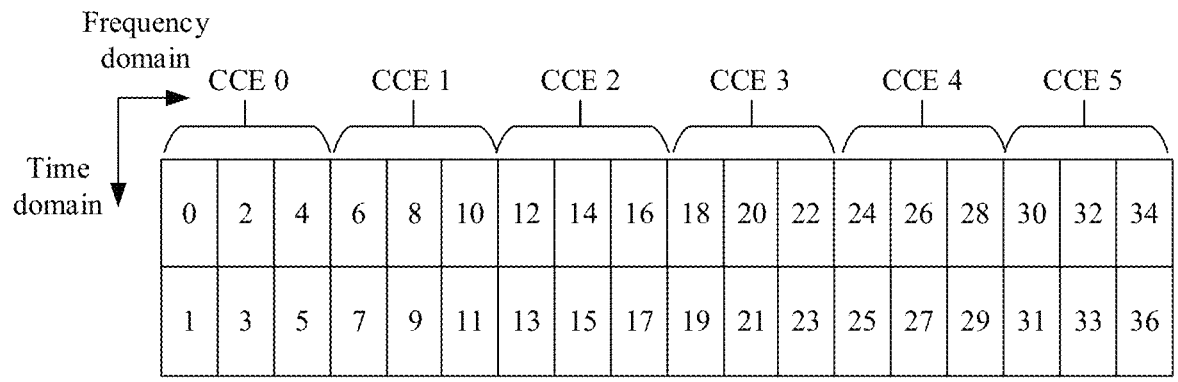
FIG. 3 is a schematic diagram of binding three REGs in frequency domain and two REGs in time domain into one CCE.
Figure 3:
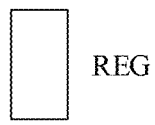
Figure 4:
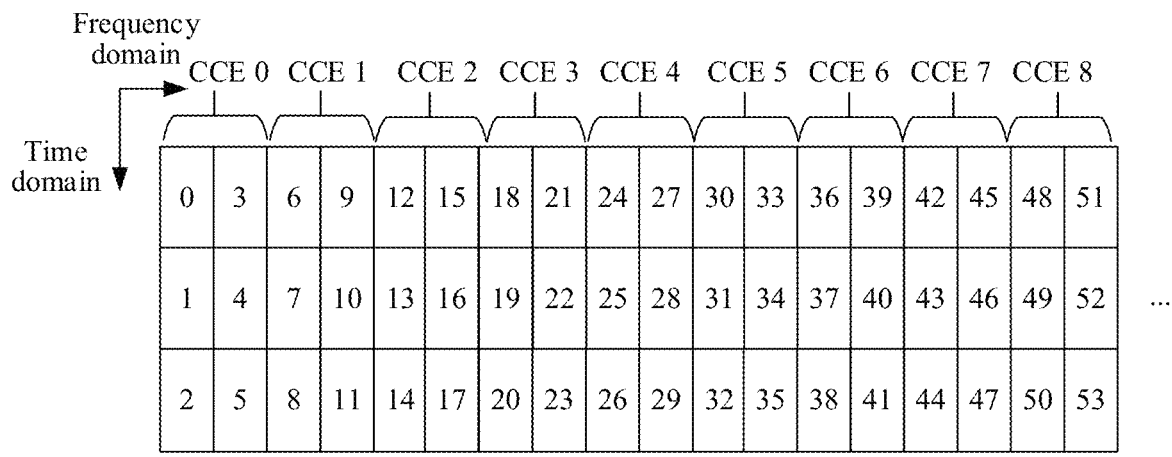
FIG. 4 is a schematic diagram of binding two REGs in frequency domain and three REGs in time domain into one CCE.
Figure 4:
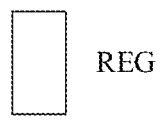

FIG. 2 is a schematic diagram of index numbers of CCEs and REGs without frequency-domain interleaving. FIG. 2 is a schematic diagram of binding six REGs in frequency domain (frequency) into one CCE. FIG. 3 is a schematic diagram of binding three REGs in frequency domain and two REGs in time domain (time) into one CCE. FIG. 4 is a schematic diagram of binding two REGs in frequency domain and three REGs in time domain into one CCE.

The foregoing mainly describes a structure and a configuration manner of a physical resource of the PDCCH. To correctly obtain DCI information, in addition to a physical resource on which DCI needs to be received, the terminal device further needs to know how to monitor DCI. Corresponding configuration information is referred to as a PDCCH search space set (Search Space Set, SS set).

A DCI type is configured in the search space set, for example, a common search space set (common search space set, CSS set) corresponding to common DCI, or a UE specific search space set (UE specific search space set) corresponding to UE specific DCI.

Figure 5:
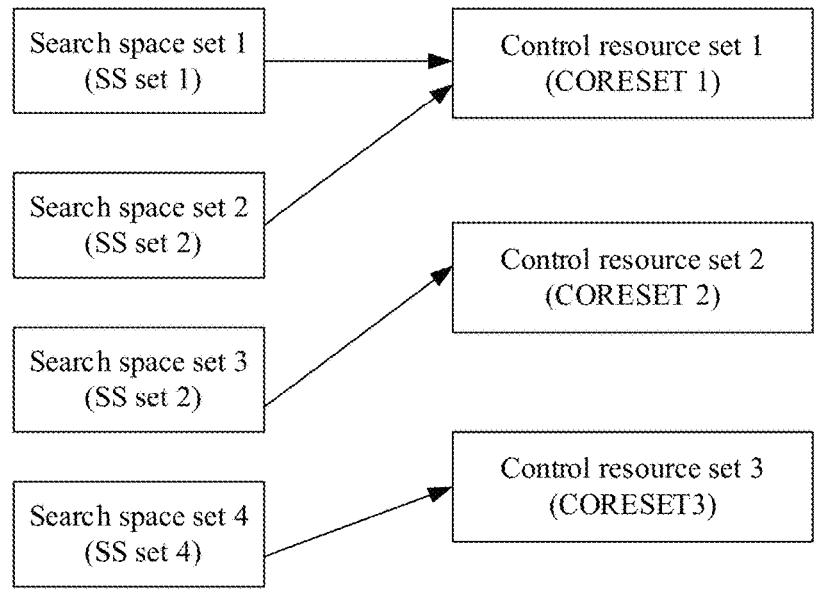
FIG. 5 is a schematic diagram of a correspondence between a search space set and a CORESET.

A CORESET index number (index value) is further configured in the search space set, to indicate that the search space set is associated with a CORESET. To be specific, DCI is monitored on a time-frequency resource of the CORESET in a monitoring manner configured in the search space set. One search space set may be associated with one CORESET. For example, FIG. 5 is a schematic diagram of a correspondence between a search space set and a CORESET. As shown in FIG. 5, an SS set 1 indicates that an index number of a search space set is 1. When monitoring DCI on a time-frequency resource of a CORESET 1, the terminal device may perform monitoring in a monitoring manner indicated by the SS set 1 or an SS set 2. When monitoring DCI on a time-frequency resource of a CORESET 2, the terminal device may perform monitoring in a monitoring manner indicated by an SS set 3. When monitoring DCI on a time-frequency resource of a CORESET 3, the terminal device may perform monitoring in a monitoring manner indicated by an SS set 4.

The search space set includes a group of PDCCH candidates (PDCCH candidate). One PDCCH candidate may represent a time-frequency resource location occupied for transmitting DCI information, and the terminal device needs to monitor the DCI at the corresponding time-frequency resource location. The PDCCH candidate may further represent a quantity of bits of the DCI monitored at the time-frequency resource location. The PDCCH candidate may further represent a monitoring periodicity for the DCI information. A quantity of PDCCH candidates represents a quantity of times of blind detection (blind detection, BD) of the terminal device (corresponding to a blind detection capability of the terminal device). For example, the terminal device can support a specific quantity of times of monitoring in a monitoring periodicity (for example, in a slot). During each time of monitoring, the terminal device needs to perform channel estimation, a decoding attempt, and determining of whether decoding is correct. Therefore, this may be understood as that processing resources of the terminal device are consumed during each time of monitoring, and the terminal device can monitor only a specific quantity of PDCCH candidates in a monitoring periodicity. The terminal device decodes a detected information bit of DCI, and parses a decoded information bit. The information bit usually includes a plurality of fields. The terminal device needs to determine, based on a predefined field sequence and a bit length of a field, information indicated by the DCI.

Figure 6:
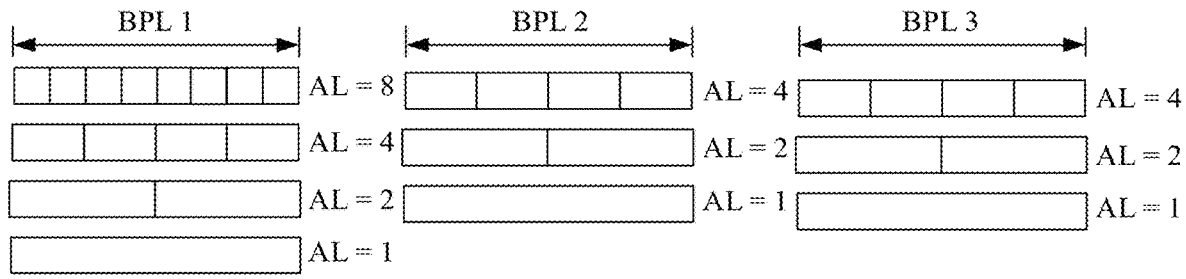
FIG. 6 is a schematic diagram of different AL configurations in a nested manner.

One or more CCE aggregation levels (aggregation level, AL) may be further configured in the search space set. The aggregation level may be understood as a quantity of CCEs carrying one piece of DCI information, that is, a specific quantity of CCEs form one resource unit for DCI monitoring. It should be understood that the aggregation level defines a size of a time-frequency resource used for each time of monitoring when the terminal device performs blind detection. A configured value of the AL is related to a DCI payload size (payload size), channel quality (for example, an SINR), and the like. For example, a larger quantity of bits of DCI indicates a larger value of the AL, and poorer channel quality indicates that a larger AL is required. The value of the AL is K. A value of K may be 1, 2, 4, 8, or 16. Correspondingly, a quantity of CCEs included in one PDCCH candidate (that is, each time of blind detection) is 1, 2, 4, 8, or 16. Each PDCCH candidate (that is, each time of blind detection) corresponds to one AL. Each time of blind detection performed by the terminal device based on a PDCCH candidate corresponds to monitoring on one AL. In addition, each PDCCH candidate (that is, each time of blind detection) corresponds to an index of a specific CCE. An index number of the CCE may be obtained by numbering the CCE in advance based on an AL. The index number of the CCE indicates a time-frequency location of the CCE. Two different PDCCH candidates (two times of blind detection) may correspond to different ALs or a same AL. If two times of blind detection correspond to a same AL, the blind detection may correspond to indexes of different CCEs. A correspondence between a PDCCH candidate and a CCE is predefined. Different ALs may occupy a same CCE set as far as possible in a nested manner, so that a channel estimation result is reused to reduce monitoring complexity for the UE. For example, FIG. 6 shows different AL configurations in a nested manner. As shown in FIG. 6, for a BPL 1, values of ALs are 1, 2, 4, and 8; for a BPL 2, values of ALs are 1, 2, and 4; for a BPL 3, values of ALs are 1, 2, and 4.

The following describes a relationship between an AL and a PDCCH candidate by using an example.

It is assumed that total resources used by the network device to send the PDCCH are 16 CCEs, and configured values of ALs may be 1, 2, 4, and 8. When an AL of a PDCCH candidate is 1, the PDCCH candidate is monitored in one CCE, and one CCE needs to be monitored during each time of blind detection. That is, when the AL is 1, the terminal device needs to perform blind detection 16 times. When an AL is 2, a granularity for blind detection may be two CCEs, and two CCEs need to be monitored during each time of blind detection. When an AL of a PDCCH candidate is 2, the PDCCH candidate is monitored in two CCEs. That is, when the AL is 2, the terminal device needs to perform blind detection eight times. When an AL is 4, a granularity for blind detection may be four CCEs, and four CCEs need to be monitored during each time of blind detection. When an AL of a PDCCH candidate is 4, the PDCCH candidate is monitored in four CCEs. That is, when the AL is 4, the terminal device needs to perform blind detection four times. When an AL is 8, a granularity for blind detection may be eight CCEs, and eight CCEs need to be monitored during each time of blind detection. When an AL of a PDCCH candidate is 8, the PDCCH candidate is monitored in eight CCEs. That is, when the AL is 8, the terminal device needs to perform blind detection twice. The terminal device does not know a value of an AL in advance, and knows only possible values of the AL. Therefore, the terminal device needs to traverse all the possible values of the AL. That is, the terminal device can detect the PDCCH by performing blind detection for a maximum of 30 times.

Figure 7:
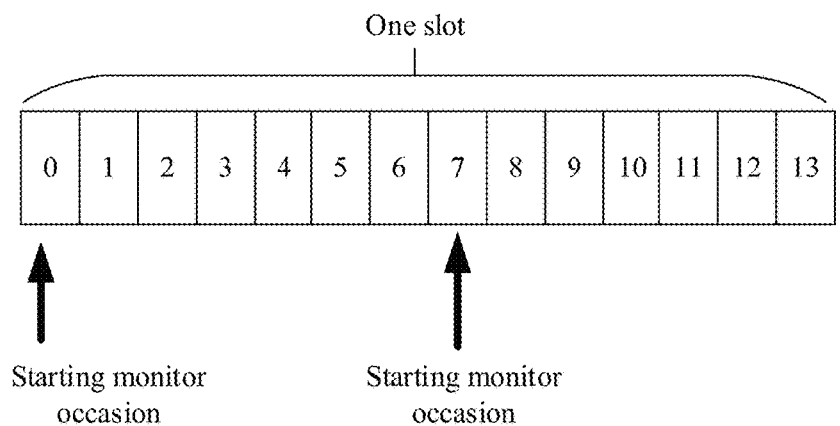
FIG. 7 is a schematic diagram of using a bitmap to indicate that an OFDM symbol serves as a starting monitor occasion.

A monitoring periodicity is further configured in the search space set, for example, one slot, two slots, or a starting OFDM symbol in a slot, to indicate when the terminal device is to monitor a corresponding PDCCH candidate. For example, FIG. 6 is a schematic diagram of a starting monitoring location in a slot. As shown in FIG. 7, a bitmap (bitmap) may be used to indicate which OFDM symbols in a slot serve as starting monitor occasions (monitor occasion). The monitor occasion may also implicitly indicate a time-domain location of a CORESET associated with the search space set.

A DCI format (DCI format) may be further configured in the search space set. The DCI format represents a payload size (payload size) of DCI that needs to be monitored by the UE, that is, a quantity of bits included in a piece of DCI information. The DCI format further represents a length and a parsing manner of each field in a piece of DCI information.

The terminal device may perform blind detection on DCI on a corresponding time-frequency resource based on a time-frequency resource location of the PDCCH and according to a corresponding blind detection criterion. A minimum unit for blind detection processing is a PDCCH candidate. Because a quantity of PDCCH candidates is limited by a processing capability of the terminal device, a maximum quantity of times of blind detection that is currently defined in a protocol for the terminal device is $M_{PDCCH}^{max,slot,\mu}$, as shown in Table 1. $\mu$ indicates a subcarrier spacing, and $\mu \in \{0,1,2,3\}$. Table 1 shows maximum quantities of times of blind detection that correspond to different subcarrier spacings per slot and per serving cell.

TABLE 1

| $\mu$ | Maximum quantity of monitored PDCCH candidates per slot and per serving cell $M_{PDCCH}^{max,\ slot,\ \mu}$ (Maximum number of monitored PDCCH candidates per slot and per serving cell) |
|---|---|
| 0 | 44 |
| 1 | 36 |
| 2 | 22 |
| 3 | 20 |

Table 1 shows monitored PDCCH candidates (monitored PDCCH candidates). The monitored PDCCH candidates are different from PDCCH candidates configured by the network device in each search space set. A quantity of monitored PDCCH candidates is less than or equal to that of PDCCH candidates configured by the network device, because in some cases, the network device configures a quantity of PDCCH candidates beyond a monitoring capability of the terminal device, and the terminal device correspondingly discards some PDCCH candidates that are beyond the capability, to finally obtain the monitored PDCCH candidates (monitored PDCCH candidates). In addition, a quantity of CCEs is also limited by a channel estimation calculation capability of the terminal device. When CCEs do not overlap, additional channel estimation needs to be performed. When CCEs overlap, channel estimation calculation may be reused. Therefore, a quantity of non-overlapped CCEs is currently defined in a protocol to represent processing complexity of performing channel estimation by the terminal device. Table 2 shows maximum quantities $C_{PDCCH}^{max,slot,\mu}$ of non-overlapped CCEs (non-overlapped CCEs) that correspond to different subcarrier spacings per slot and per serving cell. $\mu$ indicates a subcarrier spacing, and $\mu \in \{0,1,2,3\}$.

TABLE 2

| $\mu$ | Maximum quantity of non-overlapped CCEs per slot and per serving cell $C_{PDCCH}^{max,\ slot,\ \mu}$ (Maximum number of non-overlapped CCEs per slot and per serving cell) |
|---|---|
| 0 | 56 |
| 1 | 56 |
| 2 | 48 |
| 3 | 32 |

After the network device configures the search space set, at a monitor occasion, for example, in a slot n, the terminal device needs to determine whether a quantity of PDCCH candidates that currently need to be monitored and a quantity of non-overlapped CCEs exceed an upper limit (for example, as shown in Table 1 and Table 2) of a capability of the terminal device. When performing determining, the terminal device performs determining based only on a quantity of all PDCCH candidates or a quantity of non-overlapped (non-overlapped) CCEs that corresponds to a search space set of a USS. For example, if the terminal device supports monitoring for a maximum of 44 PDCCH candidates, a maximum quantity of remaining candidates obtained by subtracting, from the 44 candidates, a quantity of all candidates or a quantity of non-overlapped CCEs that corresponds to a search space set of a common search space (common search space, CSS) set needs to be used as a reference for determining. When it is determined that the quantity of PDCCH candidates or the quantity of non-overlapped CCEs exceeds a capability value of the terminal device at the monitor occasion of the slot n, a PDCCH candidate discarding mechanism is started. In the PDCCH candidate discarding mechanism, all PDCCH candidates in a search space set with the smallest index value are first selected to determine whether a quantity of the PDCCH candidates exceeds a capability range. If the quantity exceeds the capability range, none of PDCCH candidates in the search space set and a search space set whose index value is greater than that of the search space set is monitored. If the quantity does not exceed the capability range, all the PDCCH candidates in the search space set are monitored, and a sum of a quantity of all PDCCH candidates in a next search space set and the quantity of existing PDCCH candidates that need to be monitored is compared with the capability range. If the sum exceeds the capability range, none of PDCCH candidates in the search space set and a search space set whose index value is greater than that of the search space set is monitored. If the sum does not exceed the capability range, the foregoing step is repeated until it is determined that a quantity of PDCCH candidates exceeds the capability range or PDCCH candidates in all search space sets are marked as PDCCH candidates that need to be monitored.

In downlink transmission, a terminal device may simultaneously communicate with a plurality of network devices, that is, one terminal device may simultaneously receive data from a plurality of network devices. This transmission mode is referred to as coordinated multipoint transmission/reception (coordinated multiple points transmission/reception, CoMP). The plurality of network devices form a coordinating cluster to simultaneously communicate with the terminal device. The network devices in the coordinating cluster may be separately connected to different control nodes, and the control nodes exchange information with each other. For example, the control nodes exchange scheduling policy information to achieve coordinated transmission. Alternatively, all the network devices in the coordinating cluster are connected to one control node. The control node receives state information (for example, channel state information (channel state information, CSI)) or a reference signal received power (reference signal received power, RSRP) that is reported by terminal devices and that is collected by the plurality of network devices in the coordinating cluster, performs unified scheduling on all the terminal devices in the coordinating cluster based on state information of the terminal devices in the coordinating cluster, and then indicates, through interaction, a scheduling policy to the network devices connected to the terminal devices. Then each network device notifies a respective terminal device by using DCI signaling carried on a PDCCH. Through classification based on a data transmission policy of the plurality of network devices in the coordinating cluster for a terminal device, the CoMP transmission mode includes the following three types.

A first type is a dynamic point switching (dynamic point switching, DPS) mode. For a terminal device, a network device that performs data transmission with the terminal device is dynamically switched at different transmission occasions, to select, as far as possible, a network device currently in a relatively good channel condition in a coordinating cluster to perform data transmission with the terminal device. That is, a plurality of network devices perform data transmission with a terminal device in a time division manner.

A second type is a coherent joint transmission (C-JT) mode. A plurality of network devices simultaneously perform data transmission with a terminal device, and joint precoding is performed for antennas of the plurality of network devices. That is, an optimal precoding matrix is selected to perform joint phase and amplitude weighting between the antennas of the plurality of network devices. The coherent joint transmission mechanism requires accurate phase calibration of the antennas of the plurality of network devices, so that accurate phase weighting is performed between the plurality of antennas.

A third type is a non-coherent joint transmission (NC-JT) mode. A plurality of network devices simultaneously perform data transmission with a terminal device, and separate precoding is performed for antennas of the plurality of network devices. That is, an optimal precoding matrix is separately selected for each network device to perform joint phase and amplitude weighting between antennas of the network device. The non-coherent joint transmission mechanism does not require accurate phase calibration of the antennas of the plurality of network devices.

CoMP transmission scenarios may be classified into an ideal backhaul (ideal backhaul) scenario and anon-ideal backhaul (non-ideal backhaul) scenario based on an information exchange delay between network devices in a coordinating cluster.

The following briefly describes the ideal backhaul (ideal backhaul) scenario and the non-ideal backhaul (non-ideal backhaul) scenario.

In the ideal backhaul scenario, because an inter-site distance between network devices or between a network device and a control node is relatively short, or an optical fiber with a relatively small transmission loss is used for connection, an interaction delay between network devices can be ignored. In this case, interaction between network devices is a dynamic real-time interaction process. Usually, it may be assumed that a coordination mechanism is as follows: Network devices in a coordinating cluster have a central scheduling node, configured to perform joint resource scheduling for all terminal devices served by a plurality of network devices. The network devices are responsible for receiving information, such as CSI and scheduling requests, that is fed back by the terminal devices, and backhauling the information to the central scheduling node. The central scheduling node collects feedbacks from the network devices in the coordinating cluster to perform scheduling, and backhauls a scheduling policy to the network devices. A serving network device (for example, a serving transmission reception point (Serving TRP)) in the coordinating cluster delivers control information DCI to the terminal devices. According to the scheduling policy, data of the terminal devices is delivered by the serving TRP, or jointly delivered (coordinately transmitted) by the serving TRP and a coordinate network device (for example, a coordinate transmission reception point (coordinate TRP).

Figure 8:
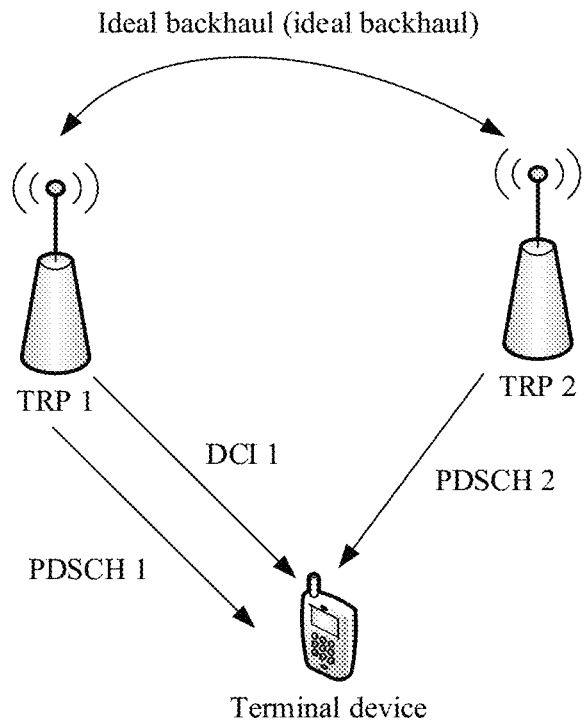
FIG. 8 is a schematic diagram of scheduling data by using one piece of DCI in an ideal backhaul scenario.

In the ideal backhaul (ideal backhaul) scenario, data scheduling indication may be performed by using one piece of DCI. FIG. 8 is a schematic diagram of scheduling data by using one piece of DCI in the ideal backhaul scenario.

Figure 9:
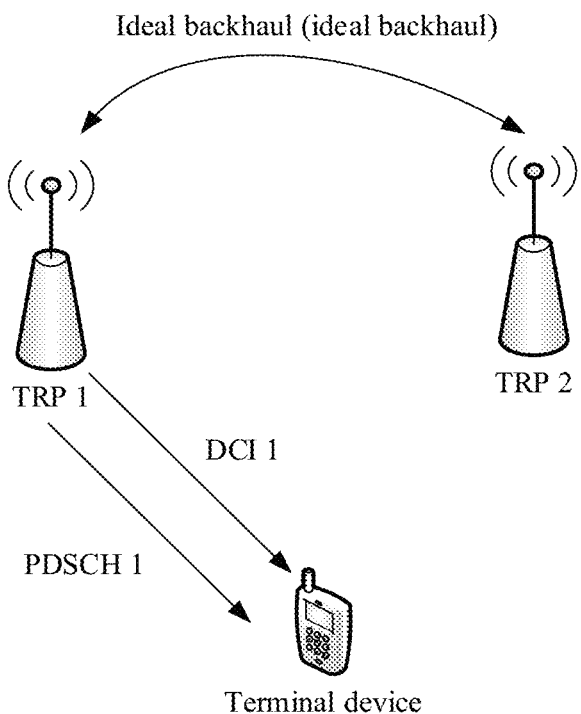
FIG. 9 is another schematic diagram of scheduling data by using one piece of DCI in an ideal backhaul scenario.

It is assumed that a TRP 1 serves as a serving TRP (that is, a serving base station), and the TRP 1 is responsible for delivering DCI 1 to a terminal device. The DCI 1 is used to indicate a time-frequency resource occupied by data to be sent to the terminal device and a sending manner. A TRP 2 is a coordinate TRP. Data of the terminal device is jointly delivered by the TRP 1 and the TRP 2. Data delivered by the TRP 1 is a PDSCH 1, and data delivered by the TRP 2 is a PDSCH 2. The sending manner includes a quantity of transmission layers used to transmit data, a modulation and coding scheme of each codeword (codeword), receive beam indication information, and the like. One codeword corresponds to one or more specific transmission layers. Each codeword corresponds to an independent modulation and coding scheme, and whether to enable or disable the codeword may be dynamically indicated. For example, in the example shown in FIG. 8, the two TRPs each transmit downlink data by using one layer, two codewords are enabled in the DCI 1 sent by the TRP 1, and each codeword corresponds to one specific transmission layer (a manifestation in a standard is that different ports correspond to different transmission layers) and one specific receive beam indication. That is, one codeword may correspond to one TRP. FIG. 9 is another schematic diagram of scheduling data by using one piece of DCI in the ideal backhaul scenario. As shown in FIG. 9, the TRP 1 transmits downlink data by using two layers. In this case, one codeword is enabled in the DCI 1, and the codeword corresponds to two specific transmission layers and receive beam indications that are used by the TRP 1. It should be understood that different codewords may be sent by one TRP (in a single-TRP transmission mode), or may be sent by different TRPs. That is, each codeword may correspond to one TRP (in the CoMP transmission mode). FIG. 9 shows the single-TRP transmission mode.

Figure 10:
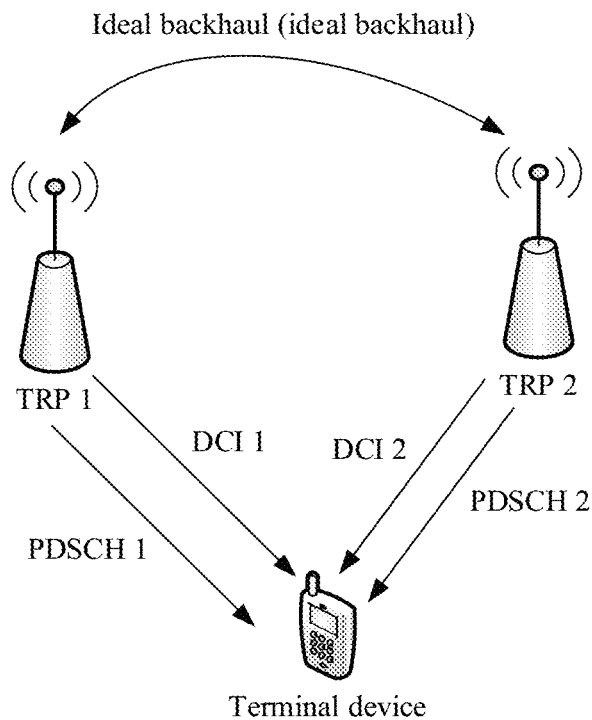
FIG. 10 is a schematic diagram of scheduling data by using two pieces of DCI in an ideal backhaul scenario.

In the ideal backhaul (ideal backhaul) scenario, data scheduling indication may be alternatively performed by using two pieces of DCI. FIG. 10 is a schematic diagram of scheduling data by using two pieces of DCI in the ideal backhaul scenario. As shown in FIG. 10, two pieces of DCI (DCI 1 and DCI 2) may be separately sent by two TRPs, or may be sent by one TRP. Each piece of DCI corresponds to a time-frequency resource allocation indication and a sending manner indication of one codeword, that is, each piece of DCI corresponds to one TRP. In this case, a terminal device is required to simultaneously monitor two pieces of DCI, and receive, based on two pieces of detected and decoded DCI, PDSCHs sent by both TRPs. Compared with scheduling two PDSCHs by using only one piece of DCI, scheduling two PDSCHs by using two pieces of DCI can improve scheduling flexibility without increasing a DCI bit length.

Figure 11:
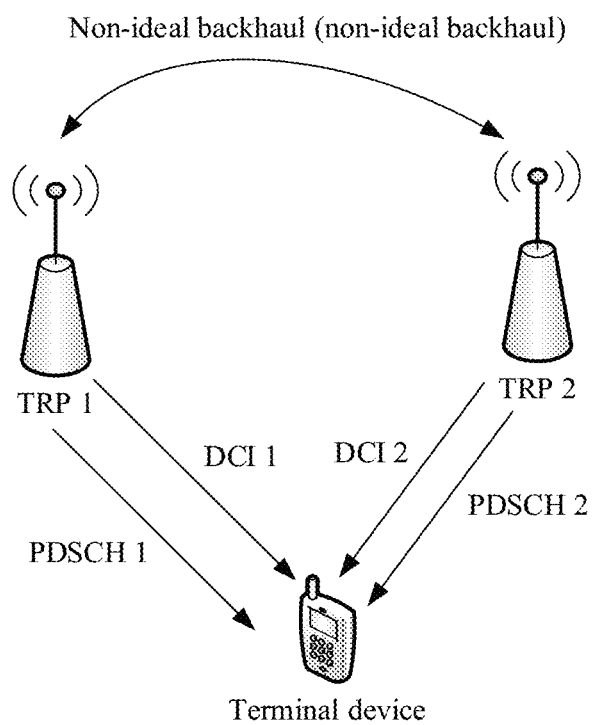
FIG. 11 is a schematic diagram of scheduling data by using two pieces of DCI in a non-ideal backhaul scenario.

In the non-ideal backhaul (non-ideal backhaul) scenario, because an interaction delay between network devices (for example, TRPs) causes a performance loss, the interaction delay between the network devices cannot be ignored. Therefore, in this scenario, two TRPs each usually deliver one piece of DCI for data scheduling. In this case, scheduling information needs to be exchanged between the two TRPs or between the two TRPs and a control node only semi-persistently. Each piece of DCI may independently indicate at least resource allocation information, a modulation and coding scheme of a corresponding codeword, and a corresponding transmission layer. FIG. 11 is a schematic diagram of scheduling data by using two pieces of DCI in the non-ideal backhaul scenario. As shown in FIG. 11, a TRP 1 sends DCI 1 to a terminal device, to schedule transmission of a PDSCH 1; and a TRP 2 sends DCI 2 to the terminal device to schedule transmission of a PDSCH 2. Each piece of DCI corresponds to one codeword. It should be understood that, if the terminal device detects only one piece of DCI in a monitoring periodicity (for example, one slot), current transmission is single-TRP transmission; or if the terminal device detects two pieces of DCI in a monitoring periodicity (for example, one slot), current transmission is multi-TRP transmission.

It should be noted that, in the ideal backhaul (ideal backhaul) scenario and the non-ideal backhaul scenario, one or more pieces of DCI are terminal device-specific DCI used for scheduling downlink data in a time period (for example, one slot, or a DCI monitoring periodicity of the terminal device). In addition, data scheduled by the DCI may occupy a same time-frequency resource or partially same time-frequency resources, and the DCI is considered as an indication manner in the coordinated transmission mode. Currently, NR supports two types of DCI used to schedule downlink data. One type is a compact DCI format that includes only a field necessary for scheduling data, and the other type is a common DCI format that includes a relatively large quantity of fields for scheduling data. A payload size of the common DCI format is usually greater than that of the compact DCI format. In addition to the DCI used to schedule downlink data, the network device may further deliver a common search space (CSS) set. Specifically, in the DCI monitoring periodicity, the terminal device may monitor the one or more pieces of DCI used to schedule downlink data, and may further monitor common DCI used to indicate a system message, reference signal (RS) trigger information, frame structure indication information, or the like. When configuring monitoring behavior of the terminal device, the network device configures a plurality of DCI formats in a search space configuration parameter, and the terminal device performs a plurality of DCI blind detection attempts based on configuration information of the plurality of DCI formats.

In a carrier aggregation (CA) mechanism, the network device may also separately send DCI on each carrier. Therefore, the terminal device also needs to have a monitoring capability of simultaneously monitoring a plurality of pieces of DCI in a monitoring time period. In this scenario, correspondingly, a maximum quantity of monitored PDCCH candidates and a quantity of non-overlapped CCEs are increased compared with a maximum quantity specified in a protocol, thereby increasing DCI monitoring complexity for the terminal device.

The following describes an example in which the terminal device needs to monitor two pieces of DCI in a monitoring periodicity.

Figure 12:
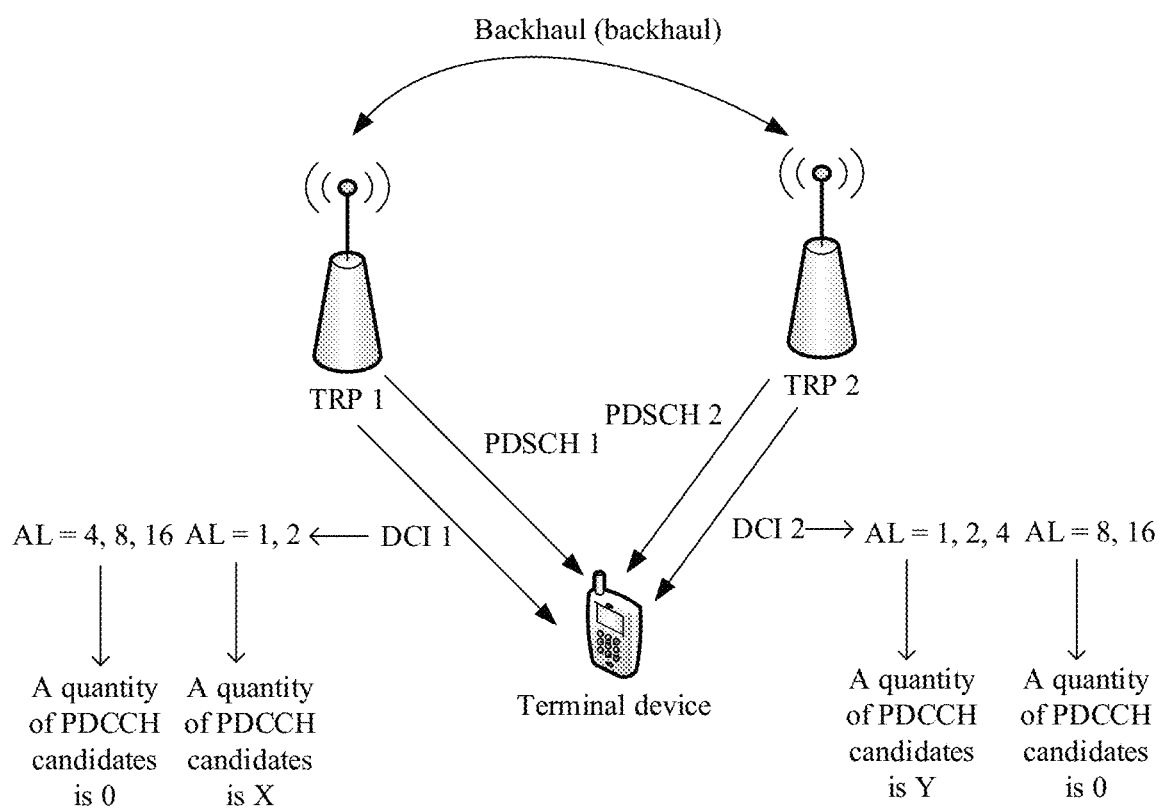
FIG. 12 is a schematic diagram of limiting a total quantity of configured PDCCH candidates by directly limiting a quantity of ALs corresponding to two pieces of DCI.

In a scenario in which two pieces of DCI are used to support multi-TRP transmission, each TRP separately delivers DCI to schedule PDSCH transmission of the TRP. In this case, each piece of DCI may correspond to an independent CORESET configuration. Because one search space set can be associated only with one CORESET, it indicates that the DCI corresponds to different search space set configurations. A quantity of PDCCH candidates may be independently configured in a search space set associated with each CORESET. To ensure flexibility of sending the DCI by the network device (for example, to avoid PDCCH blocking (blocking) when a plurality of terminal devices share a same CORESET), DCI sending flexibility equivalent to that of one piece of DCI in single-TRP transmission may be required for each of the two pieces of DCI. Therefore, a total quantity of PDCCH candidates included in all CORESETs may exceed a maximum quantity of PDCCH candidates that is specified in a protocol, and DCI blind detection complexity for the terminal device significantly increases. Therefore, to enable the terminal device to support a scenario with two or more pieces of DCI more easily, so as to support multi-TRP (multi-TRP) transmission, how to reduce blind detection complexity for the terminal device needs to be considered. A direction of consideration is mainly based on two existing parameters for measuring DCI monitoring complexity: a quantity of PDCCH candidates and a quantity of non-overlapped CCEs. For example, a maximum quantity of configured PDCCH candidates is directly limited through configuration by the network device. For example, a limitation is set as follows: A quantity of ALs corresponding to the two pieces of DCI is only a subset of a quantity of ALs that should actually be configured, to directly reduce a quantity of PDCCH candidates corresponding to a corresponding AL. For example, FIG. 12 is a schematic diagram of limiting a total quantity of configured PDCCH candidates by directly limiting a quantity of ALs corresponding to two pieces of DCI. For each of the two pieces of DCI, only some ALs and corresponding PDCCH candidates are configured based on a long-term channel condition, to limit a total quantity of PDCCH candidates configured by the network device.

For example, in the example shown in FIG. 12, ALs configured for DCI 1 are only 1 and 2. To be specific, the terminal device needs to perform blind detection only at monitoring granularities of one CCE and two CCEs, without performing blind detection at a monitoring granularity of four CCEs, eight CCEs, or 16 CCEs. That is, quantities of PDCCH candidates corresponding to the monitoring granularities of four CCEs, eight CCEs, and 16 CCEs are 0. ALs configured for DCI 2 are only 1, 2, and 4. To be specific, the terminal device needs to perform blind detection only at monitoring granularities of one CCE, two CCEs, and four CCEs, without performing blind detection at a monitoring granularity of eight CCEs or 16 CCEs. That is, quantities of PDCCH candidates corresponding to the monitoring granularities of eight CCEs and 16 CCEs are 0. In this way, a quantity of times of PDCCH blind detection that needs to be performed by the terminal device can be reduced.

However, reducing complexity of PDCCH blind detection by directly limiting a quantity of configured ALs reduces flexibility of PDCCH resource allocation, thereby affecting network performance, and configuring a relatively large quantity of ALs by the network device can improve PDCCH scheduling flexibility of the network device. A value of an AL is related to a DCI payload size (payload size), channel quality, and the like. Therefore, the value of the AL needs to be dynamically adjusted based on the DCI payload size and the channel quality. For example, directly limiting a quantity of configured ALs may affect PDCCH resource utilization. For example, when a DCI payload size (payload size) remains the same, if a limitation of configuring only a relatively large AL for DCI is set, the network device possibly cannot indicate DCI by using a PDCCH candidate with a relatively small AL when instantaneous channel quality is relatively good, thereby causing a waste of control channel resources. In addition, directly limiting a quantity of configured ALs may affect PDCCH monitoring performance. For example, when a DCI payload size remains the same, if a limitation of configuring only a relatively small AL for DCI is set, the network device possibly cannot indicate DCI by using a PDCCH candidate with a relatively large AL when instantaneous channel quality is relatively poor, thereby affecting PDCCH decoding and monitoring performance.

Based on the foregoing problems, this application provides an information transmission method and a communications apparatus. When monitoring a plurality of pieces of DCI, a terminal device may determine, based on a correspondence between ALs corresponding to the plurality of pieces of DCI, an AL corresponding to DCI that needs to be monitored, and then monitor the DCI on a PDCCH candidate corresponding to the AL. Therefore, a quantity of times of blind detection on the DCI can be reduced, and complexity of blind detection on the DCI is reduced. Further, communication efficiency and communication resource utilization are improved.

Figure 13:
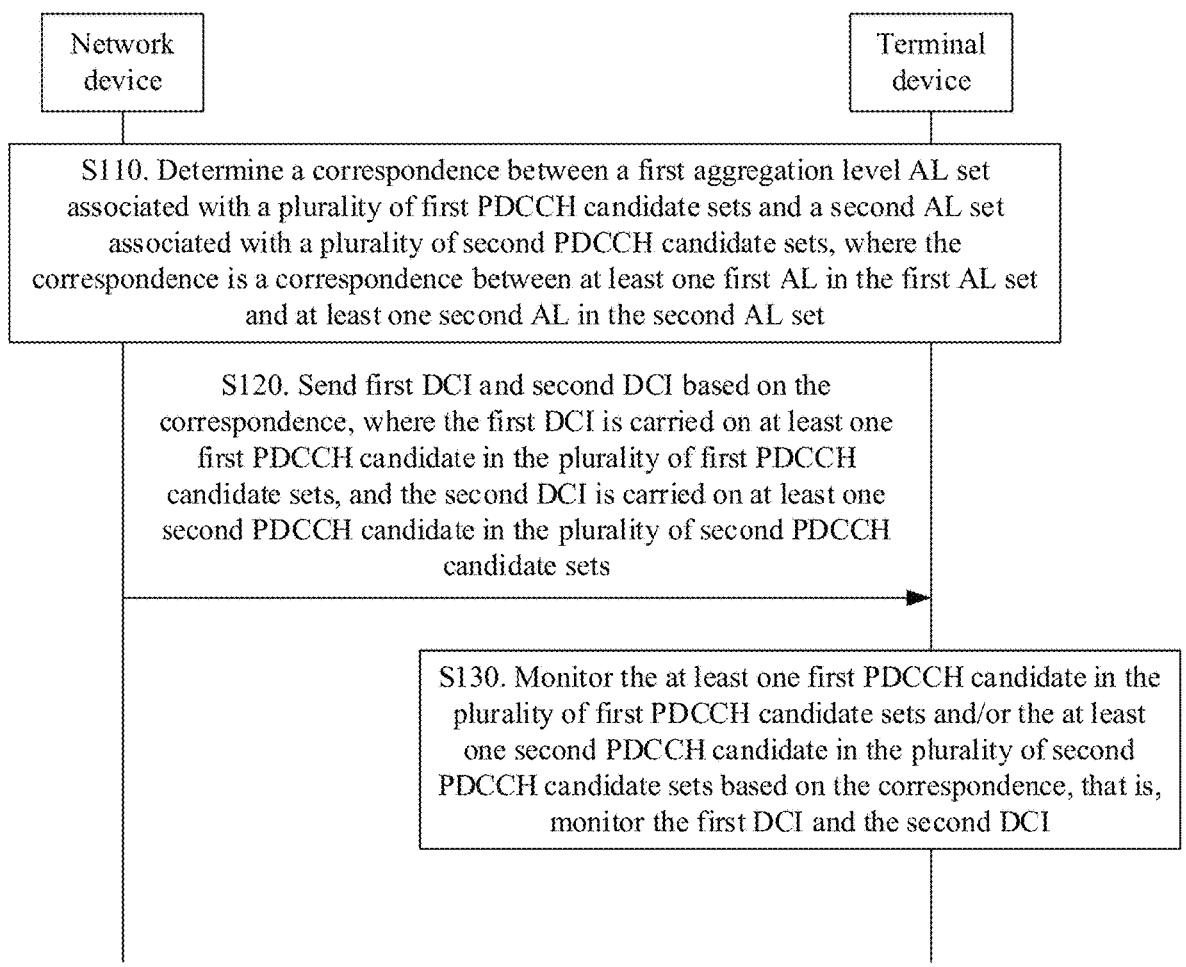
FIG. 13 is a schematic interaction diagram of an information transmission method according to an embodiment of this application.

The following describes in detail the information transmission method provided in this application with reference to FIG. 13. FIG. 13 is a schematic interaction diagram of an information transmission method 100 according to an embodiment of this application. The method 100 may be used in the ideal backhaul (ideal backhaul) scenario and the non-ideal backhaul scenario shown in FIG. 8 to FIG. 12. Certainly, the method 100 may be alternatively used in another communication scenario. This is not limited herein in this embodiment of this application.

It should be understood that, in this embodiment of this application, the method 100 is described by using an example in which steps of the method 100 are performed by a terminal device and a network device. As an example rather than a limitation, the steps of the method 100 may be alternatively performed by a chip used in a terminal device and a chip used in a network device.

As shown in FIG. 13, the method 100 includes the following steps.

S110. A network device and a terminal device determine a correspondence between a first aggregation level AL set associated with a plurality of PDCCH candidates and a second AL set associated with a plurality of second PDCCH candidates. The correspondence is a correspondence between at least one first AL in the first AL set and at least one second AL in the second AL set.

S120. The network device sends first DCI and second DCI to the terminal device based on the correspondence. The first DCI is carried on at least one of the plurality of first PDCCH candidates. The second DCI is carried on at least one of the plurality of second PDCCH candidates.

S130. The terminal device monitors the at least one of the plurality of first PDCCH candidates and/or the at least one of the plurality of second PDCCH candidates based on the correspondence, that is, monitors the first DCI and the second DCI.

Alternatively, step S110 may be described as follows: A network device and a terminal device determine a correspondence between a first aggregation level AL and a second AL. The correspondence is a correspondence between the first AL and the second AL. A value of the first AL is x, and a value of the second AL is y; or a value of the first AL is x, and a value of the second AL is y, z, or the like.

Alternatively, step S130 may be described as follows: The terminal device monitors, based on the correspondence, the first DCI on a time-frequency resource unit including x CCEs and/or monitors the second DCI on a time-frequency resource unit including y CCEs. There are one or more time-frequency resource units including the x CCEs, and there is one or more time-frequency resource units including the y CCEs.

Specifically, when the network device transmits control information and data to the terminal device in a multi-TRP transmission mode, the network device sends a plurality of pieces of DCI to the terminal device in the multi-TRP transmission mode, and each piece of DCI is used to schedule a resource for transmitting data to the terminal device. Each piece of DCI is carried on at least one PDCCH candidate (candidate) in a plurality of PDCCH candidate sets corresponding to the DCI. The PDCCH candidate may be understood as a time-frequency resource location at which a PDCCH (that is, DCI) may appear. In this embodiment of this application, the first DCI and the second DCI are used to represent the plurality of pieces of DCI. The first DCI and the second DCI merely represent different DCI, and a quantity of the first DCI and a quantity of the second DCI are not limited. There may be a plurality of pieces of first DCI, and there may also be a plurality of pieces of second DCI. The first DCI may be sent by a TRP 1 to the terminal device, and the second DCI may be sent by a TRP 2 to the terminal device. Alternatively, the first DCI and the second DCI may be sent by one TRP to the terminal device, but the two pieces of DCI are used to schedule different transmission resources.

Specifically, the first DCI is used to schedule first data, and the second DCI is used to schedule second data. The first data and the second data may be located on a same carrier or a same bandwidth part, that is, the first data and the second data may occupy a same frequency-domain resource. Optionally, the first data and the second data may be alternatively located on different carriers or different bandwidth parts, that is, the first data and the second data may occupy different frequency-domain resources.

Optionally, the first DCI and the second DCI are located on a same carrier or a same bandwidth part, that is, the first DCI and the second DCI may occupy a same frequency-domain resource. Optionally, the first DCI and the second DCI may be alternatively located on different carriers or different bandwidth parts, that is, the first DCI and the second DCI may occupy different frequency-domain resources.

Optionally, the terminal device receives the first DCI and the second DCI by using different QCL assumptions.

Optionally, the terminal device receives the first data and the second data by using different QCL assumptions.

When the network device needs to send the first DCI and the second DCI to the terminal device, in step S110, the network device determines the correspondence between the first aggregation level AL set associated with the plurality of first PDCCH candidates and the second AL set associated with the plurality of second PDCCH candidates. The correspondence is a correspondence between at least one first AL in the first AL set and at least one second AL in the second AL set. The network device sends the first DCI on a time-frequency resource corresponding to the at least one of the plurality of first PDCCH candidates, that is, the first DCI is carried on the time-frequency resource corresponding to the at least one of the plurality of first PDCCH candidates. The network device sends the second DCI on a time-frequency resource corresponding to the at least one of the plurality of second PDCCH candidates, that is, the second DCI is carried on the time-frequency resource corresponding to the at least one of the plurality of second PDCCH candidates. The terminal device monitors the first DCI on the at least one of the plurality of first PDCCH candidates, and the terminal device monitors the second DCI on the at least one of the plurality of second PDCCH candidates. The plurality of first PDCCH candidates are associated with the first AL set, and the plurality of second PDCCH candidates are associated with the second AL set. The plurality of first PDCCH candidates may be understood as all PDCCH candidate locations at which the first DCI may appear, that is, the plurality of first PDCCH candidates include all possible first PDCCH candidates. The first DCI is carried on the at least one of the plurality of first PDCCH candidates. Similarly, the plurality of second PDCCH candidates may be understood as all candidate locations at which the second DCI may appear, that is, the plurality of second PDCCH candidates include all possible second PDCCH candidates. The second DCI is carried on the at least one of the plurality of second PDCCH candidates. An association relationship between a plurality of PDCCH candidates and an AL set is preconfigured, or is predefined in a protocol. Each PDCCH candidate corresponds to one value of an AL.

The following describes the association relationship between a plurality of PDCCH candidates and an AL set by using an example.

For example, it is assumed that time-frequency resources of the plurality of first PDCCH candidates are 16 CCEs. A CCE is a time-frequency resource unit for carrying DCI. Configured values of a first AL may be 1, 2, 4, and 8, that is, the first AL set is {1, 2, 4, 8}. When the first AL is 1, a granularity for blind detection may be one CCE, and one CCE needs to be monitored during each time of blind detection. When an AL of a first PDCCH candidate is 1, the first PDCCH candidate is monitored in one CCE. To be specific, when the first AL is 1, a size of a time-frequency resource unit for carrying DCI is one CCE, and the terminal device needs to perform blind detection 16 times. When the first AL is 1, there are correspondingly 16 first PDCCH candidates. When the first AL is 2, a granularity for blind detection may be two CCEs, and two CCEs need to be monitored during each time of blind detection. When an AL of a first PDCCH candidate is 2, the first PDCCH candidate is monitored in two CCEs. To be specific, when the first AL is 2, a size of a time-frequency resource unit for carrying DCI is two CCEs, and the terminal device needs to perform blind detection eight times. When the first AL is 2, there are correspondingly eight first PDCCH candidates. When the first AL is 4, a granularity for blind detection may be four CCEs, and four CCEs need to be monitored during each time of blind detection. When an AL of a first PDCCH candidate is 4, the first PDCCH candidate is monitored in four CCEs. To be specific, when the first AL is 4, a size of a time-frequency resource unit for carrying DCI is four CCEs, and the terminal device needs to perform blind detection four times. When the first AL is 4, there are correspondingly four first PDCCH candidates. When the first AL is 8, a granularity for blind detection may be eight CCEs, and eight CCEs need to be monitored during each time of blind detection. When an AL of a first PDCCH candidate is 8, the first PDCCH candidate is monitored in eight CCEs. To be specific, when the AL is 8, a size of a time-frequency resource unit for carrying DCI is eight CCEs, and the terminal device needs to perform blind detection twice. When the first AL is 8, there are correspondingly two first PDCCH candidates. The terminal device does not know a value of the first AL in advance, and knows only possible values of the first AL, that is, knows only the first AL set. Therefore, the terminal device needs to traverse all the possible values of the first AL. That is, the terminal device can detect a first PDCCH, that is, detect the first DCI, by performing blind detection for a maximum of 30 times. The 30 times herein may be understood as a quantity of PDCCH candidates included in the plurality of PDCCH candidates.

It should be understood that the foregoing example is merely intended to describe the association relationship between a plurality of PDCCH candidates and an AL set, and does not constitute a limitation on an association relationship between a PDCCH candidate and an AL set in this application.

The correspondence is a correspondence between at least one first AL in the first AL set and at least one second AL in the second AL set. The first AL set and the second AL set are preconfigured, or are predefined in a protocol. To be specific, the correspondence between at least one first AL in the first AL set and at least one second AL in the second AL set is preconfigured or predefined. The value of the first AL may be any value included in the first AL set, and the value of the second AL may be any value included in the second AL set. In this embodiment of this application, the correspondence between at least one first AL in the first AL set and at least one second AL in the second AL set is a preconfigured or predefined correspondence between at least one first AL in the first AL set and at least one second AL in the second AL set, unless otherwise specified.

The AL may be understood as a quantity of bound CCEs, that is, may be understood as a quantity of CCEs for carrying one piece of DCI information. That is, a specific quantity of CCEs form one resource unit for DCI monitoring. The AL defines a size of a time-frequency resource used for each time of monitoring when the terminal device performs blind detection. The terminal device may determine, based on a value of the AL, a quantity of CCEs bound as one resource unit for DCI (PDCCH) monitoring, that is, a resource granularity for each time of monitoring during DCI monitoring. The network device may determine, based on the AL, a quantity of CCEs bound as one resource unit for sending DCI, that is, a resource granularity or a resource unit used for sending DCI. The first AL set and the second AL set each may include one or more values. After the network device determines the correspondence between at least one first AL in the first AL set and at least one second AL in the second AL set, in step S120, the network device may send the first DCI and the second DCI to the terminal device based on the correspondence.

With reference to a specific example, the following describes step S120: The network device sends first DCI and second DCI to the terminal device. The first DCI is carried on at least one of the plurality of first PDCCH candidates. The second DCI is carried on at least one second PDCCH candidate in the plurality of second PDCCH candidates.

It is assumed that values in the preconfigured first AL set corresponding to the first DCI include 1, 2, 4, and 8, and values in the preconfigured second AL set corresponding to the second DCI also include 1, 2, 4, and 8, that is, the first AL set is {1, 2, 4, 8}, and the second AL set is {1, 2, 4, 8}. In this case, the first DCI may be sent on PDCCH candidates corresponding to AL values of 1, 2, 4, and 8, and the second DCI may also be sent on the PDCCH candidates corresponding to the AL values of 1, 2, 4, and 8. It is assumed that a preconfigured correspondence (which may also be referred to as an association relationship) between at least one first AL in the first AL set and at least one second AL in the second AL set is a one-to-one correspondence. To be specific, one value in the first AL set corresponds to one value in the second AL set. For example, AL=1 in the first AL set corresponds to AL=1 in the second AL set, AL=2 in the first AL set corresponds to AL=2 in the second AL set, AL=4 in the first AL set corresponds to AL=4 in the second AL set, and AL=8 in the first AL set corresponds to AL=8 in the second AL set. If an AL used by the network device for sending the first DCI at a monitor occasion of the terminal device is 1, an AL used by the network device for sending the second DCI at the monitor occasion is also 1. If an AL used by the network device for sending the first DCI at a monitor occasion of the terminal device is 8, an AL used by the network device for sending the second DCI at the monitor occasion is also 8. It can be understood that the correspondence is not specifically limited. For example, AL=1 in the first AL set corresponds to AL=1 and AL=2 in the second AL set.

It should be understood that the first DCI and the second DCI are located in one monitoring time period or monitoring periodicity of the terminal device, for example, one slot, one mini-slot, or a plurality of same slots. This is not limited in this embodiment of the present invention.

It should be further understood that the foregoing example is merely intended to describe an example process of sending the first DCI and the second DCI by the network device to the terminal device based on the correspondence between at least one first AL in the first AL set and at least one second AL in the second AL set, and does not constitute a limitation on values in the first AL set and the second AL set or the correspondence in this application.

In step S130, the terminal device monitors the at least one of the plurality of first PDCCH candidates and/or the at least one of the plurality of second PDCCH candidates based on the correspondence. To be specific, the terminal device monitors the first DCI on the at least one of the plurality of first PDCCH candidates, and monitors the second DCI on the at least one of the plurality of second PDCCH candidates. The first DCI and the second DCI are located in one monitoring time period. To be specific, the terminal device monitors the first DCI and the second DCI in one monitoring time period.

For example, it is assumed that the terminal device detects the first DCI on a first PDCCH candidate corresponding to a first AL, that is, the first DCI is carried on one or more first PDCCH candidates corresponding to the first AL. A value of the first AL may be any one or more of values included in a preconfigured first AL set. The terminal device may determine, based on the correspondence, at least one second AL that is included in the second AL set and that is associated with (corresponding to) the first AL. Then the second DCI is monitored only on one or more second PDCCH candidates associated with the at least one second AL, without monitoring the second DCI on PDCCHs corresponding to all second ALs included in the second AL set. Therefore, a quantity of times of blind detection performed by the terminal device on the second DCI can be reduced, and complexity of blind detection on the DCI is reduced.

Alternatively, it is assumed that the terminal device detects the second DCI on a second PDCCH candidate corresponding to a second AL, that is, the second DCI is carried on one or more second PDCCH candidates corresponding to the second AL. A value of the second AL may be any one or more of values included in a preconfigured second AL set. The terminal device may determine, based on the correspondence, at least one first AL that is included in the first AL set and that is associated with (corresponding to) the second AL. Then the first DCI is monitored only on one or more first PDCCH candidates associated with the at least one first AL, without monitoring the first DCI on PDCCHs corresponding to all possible first ALs included in the first AL set. Therefore, a quantity of times of blind detection performed by the terminal device on the first DCI can be reduced, and complexity of blind detection on the DCI is reduced.

In the information transmission method provided in this application, when monitoring a plurality of pieces of DCI, the terminal device may determine, based on a correspondence between ALs corresponding to the plurality of pieces of DCI, an AL corresponding to DCI that needs to be monitored, and then monitor the DCI on a PDCCH candidate corresponding to the AL, without monitoring the DCI on PDCCH candidates corresponding to all possible ALs of each piece of DCI. All the possible ALs are all ALs for monitoring DCI. Different ALs indicate different granularities of time-frequency resources for carrying DCI. Therefore, a quantity of times of blind detection on the DCI can be reduced, and complexity of blind detection on the DCI is reduced. Further, communication efficiency and communication resource utilization are improved.

Figure 14:
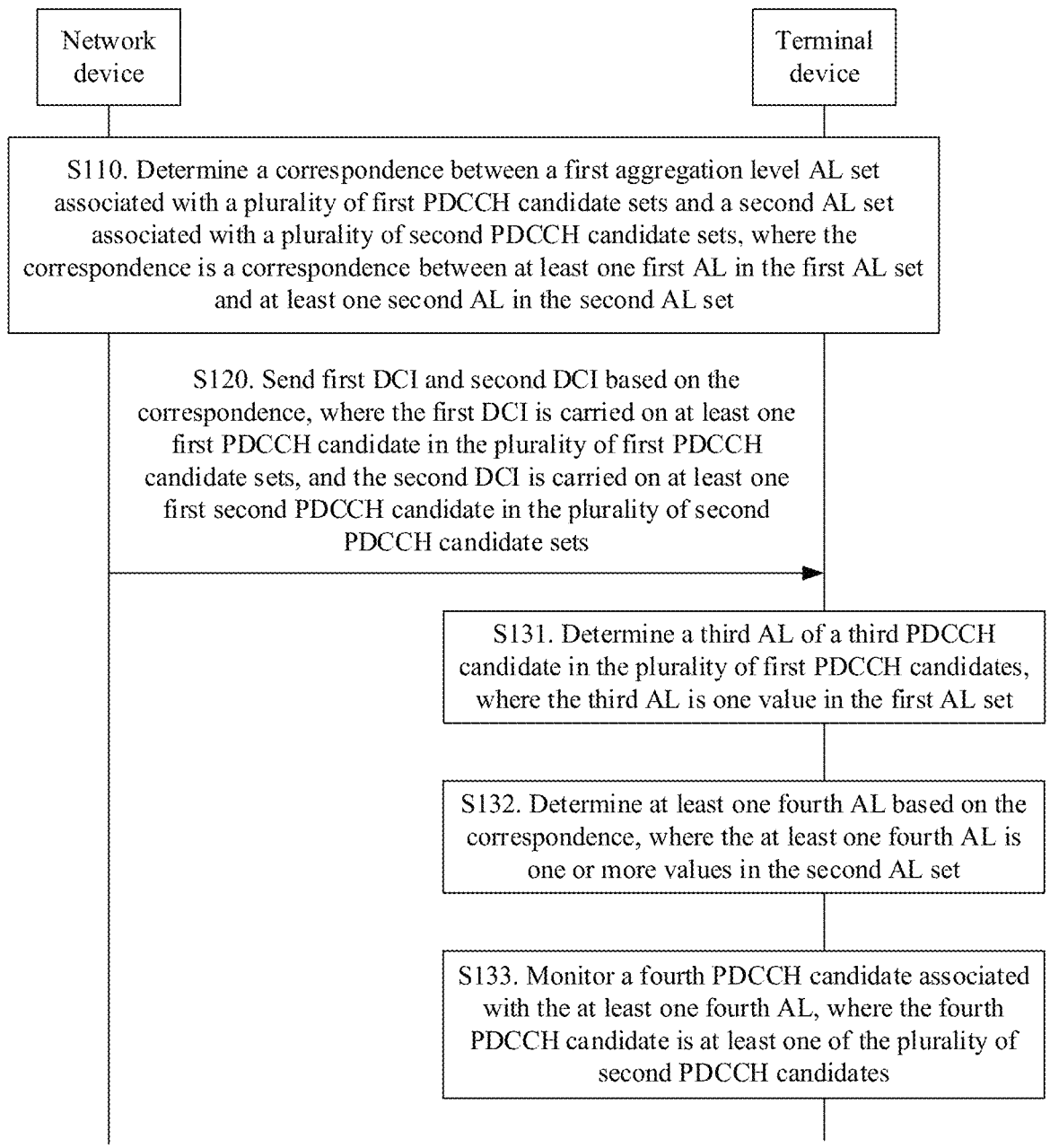
FIG. 14 is a schematic interaction diagram of an information transmission method according to another embodiment of this application.

FIG. 14 is a schematic interaction diagram of an information transmission method according to some embodiments of this application. In some embodiments, based on the method shown in FIG. 13, the correspondence is a correspondence between at least one first AL in the first AL set and at least one second AL in the second AL set. The monitoring the at least one of the plurality of first PDCCH candidates and/or the at least one of the plurality of second PDCCH candidates based on the correspondence in step S130 includes the following steps.

S131. The terminal device determines a third AL of a third PDCCH candidate in the plurality of first PDCCH candidates, where the third AL is one value in the first AL set, that is, the terminal device detects the first DCI on the third PDCCH candidate. The third PDCCH candidate is one or more of the plurality of first PDCCH candidates.

S132. The terminal device determines at least one fourth AL based on the correspondence. The at least one fourth AL is one or more values in the second AL set.

S133. The terminal device monitors a fourth PDCCH candidate associated with the at least one fourth AL. The fourth PDCCH candidate is at least one of the plurality of second PDCCH candidates.

Specifically, for descriptions of steps S110 and S120 shown in FIG. 14, refer to the foregoing descriptions of steps S110 and S120. For brevity, details are not described herein again.

When the correspondence is a correspondence from at least one first AL in the first AL set to at least one second AL in the second AL set, a value of the second AL may be determined based on a determined value of the first AL and with reference to a correspondence from the value of the first AL to the value of the second AL. The "determined value of the first AL" herein may be understood as an AL of the detected first DCI. The "determining a value of the second AL" herein may be understood as determining a monitored PDCCH candidate, and the monitored PDCCH candidate is a PDCCH candidate corresponding to the second AL. That is, the correspondence is a unidirectional correspondence from the value of the first AL to the value of the second AL, and the correspondence has directivity. In step S131, the terminal device determines the third AL of the third PDCCH candidate in the plurality of first PDCCH candidates, where the third AL is one value in the first AL set, that is, the third AL belongs to the first AL set. To be specific, the terminal device detects the first DCI on one or more third PDCCH candidates corresponding to the third AL, or the terminal device detects that an AL of the first DCI is the third AL. In other words, the network device sends the first DCI on the one or more third PDCCH candidates corresponding to the third AL. The third PDCCH candidate is one or more of the plurality of first PDCCH candidates. The terminal device needs to determine that detected DCI is the first DCI. It should be understood that a value of the third AL may be one or more of the values included in the preconfigured first AL set. For example, the preconfigured first AL set corresponding to the first DCI includes 1, 2, 4, and 8. The value of the third AL may be any one or more of 1, 2, 4, and 8. When performing blind detection on the first DCI, the terminal device needs to perform blind detection on PDCCH candidates corresponding to all the ALs included in the preconfigured first AL set corresponding to the first DCI.

An example in which the preconfigured first AL set includes 1, 2, 4, and 8 is used for description. It is assumed that a time-frequency resource used by the network device to send a first PDCCH (the first DCI) includes 16 CCEs, and the values in the preconfigured first AL set may be 1, 2, 4, and 8. When the first AL is 1, a granularity for blind detection may be one CCE, and one CCE needs to be monitored during each time of blind detection. When an AL of a first PDCCH candidate is 1, the first PDCCH candidate is monitored in one CCE. That is, when the first AL is 1, the terminal device needs to perform blind detection 16 times. When the AL is 1, there are correspondingly 16 PDCCH candidates. When an AL is 2, a granularity for blind detection may be two CCEs, and two CCEs need to be monitored during each time of blind detection. When an AL of a first PDCCH candidate is 2, the first PDCCH candidate is monitored in two CCEs. That is, when the AL is 2, the terminal device needs to perform blind detection eight times. When the AL is 2, there are correspondingly eight PDCCH candidates. When an AL is 4, a granularity for blind detection may be four CCEs, and four CCEs need to be monitored during each time of blind detection. When an AL of a first PDCCH candidate is 4, the first PDCCH candidate is monitored in four CCEs. That is, when the AL is 4, the terminal device needs to perform blind detection four times. That is, when the AL is 4, there are correspondingly four PDCCH candidates. When an AL is 8, a granularity for blind detection may be eight CCEs, and eight CCEs need to be monitored during each time of blind detection. When an AL of a first PDCCH candidate is 8, the first PDCCH candidate is monitored in eight CCEs. When the AL is 8, the terminal device needs to perform blind detection twice. That is, when the AL is 8, there are correspondingly two PDCCH candidates. The terminal device does not know, in advance, the first AL used by the network device to send the first DCI is which value in the preconfigured first AL set, and knows only possible values of the first AL (that is, the values included in the first AL set). Therefore, the terminal device needs to traverse all the possible values of the first AL. It is assumed that the terminal device detects the first DCI when the AL is 4, that is, the third AL is 4. There are four third PDCCH candidates corresponding to the third AL.

In S132, the terminal device determines the at least one fourth AL based on the correspondence and with reference to the determined value of the first AL. The at least one fourth AL is one or more values in the second AL set.

An example in which a preconfigured second AL set includes 1, 2, 4, and 8 is used for description. It is assumed that the third AL of the detected first DCI is 4, and the correspondence between at least one first AL in the first AL set and at least one second AL in the second AL set is a one-to-one correspondence. To be specific, one value in the first AL set corresponds to one value in the second AL set. In addition, AL=1 in the first AL set corresponds to AL=1 in the second AL set, AL=2 in the first AL set corresponds to AL=2 in the second AL set, AL=4 in the first AL set corresponds to AL=4 in the second AL set, and AL=8 in the first AL set corresponds to AL=8 in the second AL set. In this case, it may be determined that a value of the fourth AL is 4.

In S133, the terminal device monitors the fourth PDCCH candidate associated with the at least one fourth AL. The fourth PDCCH candidate is at least one of the plurality of second PDCCH candidates.

For description with reference to the foregoing example, it is assumed that the preconfigured second AL set includes 1, 2, 4, and 8, and the value of the fourth AL that is determined based on the correspondence is 4. To be specific, the terminal device needs to monitor the second DCI only on a PDCCH candidate corresponding to the fourth AL whose value is 4. It is assumed that a time-frequency resource used by the network device to send a second PDCCH (the second DCI) includes eight CCEs, and the terminal device monitors only two PDCCH candidates corresponding to the fourth AL whose value is 4. To be specific, when monitoring the second DCI, the terminal device needs to perform blind detection only twice, that is, perform blind detection on two second PDCCH candidates. Each of the two second PDCCH candidates corresponds to the fourth AL whose value is 4. The terminal device does not need to perform blind detection on the second DCI on PDCCH candidates corresponding to possible values 1, 2, and 8 of the second AL, so that a quantity of times of blind detection performed by the terminal device can be greatly reduced, and complexity of blind detection on DCI is reduced.

It should be understood that, if the terminal device detects the first DCI on PDCCH candidates corresponding to a plurality of values of the third AL, the terminal device detects a plurality of values of the AL of the first DCI. The terminal device may select a larger or smaller one of the plurality of values of the third AL, and determine one or more fourth ALs by using the larger or smaller value and with reference to the correspondence. Alternatively, the terminal device may determine one or more fourth ALs by using each of the plurality of values of the fourth AL and with reference to the correspondence.

Figure 15:
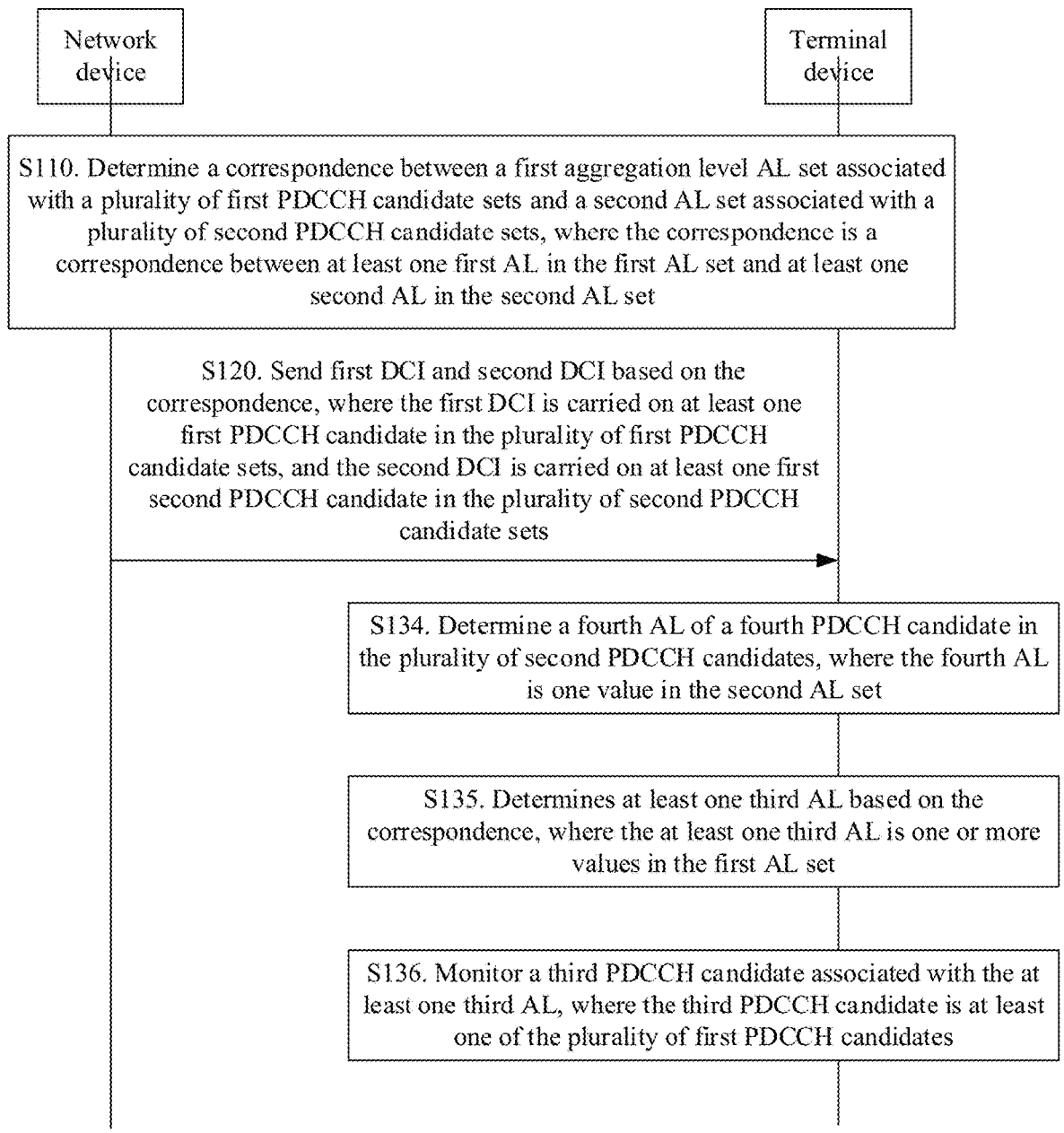
FIG. 15 is a schematic interaction diagram of an information transmission method according to some embodiments of this application.

FIG. 15 is a schematic interaction diagram of an information transmission method according to some embodiments of this application. The correspondence is a correspondence from at least one second AL in the second AL set to at least one first AL in the first AL set. The monitoring the at least one first PDCCH candidate in the plurality of PDCCH candidate sets and/or the at least one second PDCCH candidate in the plurality of PDCCH candidate sets based on the correspondence in step S130 includes the following steps.

S134. The terminal device determines a fifth AL of a fifth PDCCH candidate in the plurality of second PDCCH candidates, where the fifth AL is one value in the second AL set, that is, the terminal device detects the second DCI on one or more fifth PDCCH candidates corresponding to the fifth AL.

S135. The terminal device determines at least one sixth AL based on the correspondence. The at least one sixth AL is one or more values in the first AL set.

S136. The terminal device monitors a sixth PDCCH candidate associated with the at least one sixth AL. The sixth PDCCH candidate is at least one of the plurality of first PDCCH candidates.

Specifically, for descriptions of steps S110 and S120 shown in FIG. 15, refer to the foregoing descriptions of steps S110 and S120. For brevity, details are not described herein again.

Specifically, when the correspondence is a correspondence from at least one second AL in the second AL set to at least one first AL in the first AL set, a value of the first AL may be determined based on a determined value of the second AL and with reference to a correspondence from the value of the second AL to the value of the first AL. The "determined value of the second AL" herein may be understood as an AL of the detected second DCI. The "determining a value of the first AL" herein may be understood as determining a monitored PDCCH candidate, and the monitored PDCCH candidate is a PDCCH candidate corresponding to the first AL. That is, the correspondence is a unidirectional correspondence from the value of the second AL to value of the first AL, and the correspondence has directivity. In S134, the terminal device determines the fifth AL of the fifth PDCCH candidate in the plurality of second PDCCH candidates. The fifth AL is one value in the second AL set, and the fifth AL belongs to the second AL set. The terminal device detects the second DCI on the one or more fifth PDCCH candidates corresponding to the fifth AL. In other words, the network device sends the second DCI on the one or more fifth PDCCH candidates corresponding to the fifth AL. The fifth PDCCH candidate is one or more of the plurality of second PDCCH candidates. The terminal device needs to determine that detected DCI is the second DCI. It should be understood that a value of the fifth AL of the detected second DCI may be one or more of the values included in the preconfigured second AL set. For example, the preconfigured second AL set corresponding to the second DCI includes 1, 2, 4, and 8. The value of the fifth AL may be any one or more of 1, 2, 4, and 8. When performing blind detection on the second DCI, the terminal device needs to perform blind detection on PDCCH candidates corresponding to all the AL values included in the preconfigured second AL set corresponding to the second DCI. In S135, the terminal device may determine, based on the correspondence and with reference to the determined value of the fifth AL, a value of the sixth AL corresponding to the first DCI. The value of the sixth AL that is determined based on the correspondence may be one or more of the values included in the preconfigured first AL set.

In S136, the terminal device monitors the sixth PDCCH candidate associated with the at least one sixth AL, where the sixth PDCCH candidate is at least one of the plurality of first PDCCH candidates, that is, the terminal device monitors the first DCI on at least one PDCCH candidate corresponding to the sixth AL. The terminal device does not need to perform blind detection on the first DCI on PDCCH candidates corresponding to all the possible AL values in the preconfigured first AL set, so that a quantity of times of blind detection performed by the terminal device can be greatly reduced, and complexity of blind detection on DCI is reduced.

For descriptions of step S134 to step S136, refer to the descriptions of step S131 to step S133. A difference is as follows: In step S131 to step S133, the correspondence is a correspondence from the value of the first AL to the value of the second AL, and the value of the second AL needs to be determined based on the value of the first AL of the detected first DCI and with reference to the correspondence. However, in step S134 to step S136, the correspondence is a correspondence from the value of the second AL to the value of the first AL, and the value of the first AL needs to be determined based on the value of the second AL of the detected second DCI and with reference to the correspondence. For brevity, details are not described herein again.

It should be understood that, if the fifth AL corresponding to the detected second PDCCH candidate has a plurality of values, the terminal device detects a plurality of values of the AL of the second DCI. The terminal device detects the second DCI on PDCCH candidates corresponding to the plurality of values of the fifth AL. The terminal device may select a larger or smaller one of the plurality of values of the fifth AL, and determine the sixth AL by using the larger or smaller value and with reference to the correspondence. Alternatively, the terminal device may determine one or more sixth ALs by using each of the plurality of values of the fifth AL and with reference to the correspondence.

It should be understood that, if the correspondence between at least one second AL in the second AL set and at least one first AL in the first AL set is unidirectional, for example, when the correspondence is a correspondence from at least one first AL in the first AL set to at least one second AL in the second AL set, a monitoring sequence of the terminal device is limited. The terminal device first detects the first DCI, and then determines the AL (the fourth AL) of the second DCI based on a monitoring result (the third AL) of the first DCI and with reference to the correspondence.

When the correspondence is a correspondence from at least one second AL in the second AL set to at least one first AL in the first AL set, a monitoring sequence of the terminal device is also limited. The terminal device first detects the second DCI, and then determines the AL (the sixth AL) of the first DCI based on a monitoring result (the fifth AL) of the second DCI and with reference to the correspondence.

Optionally, in some embodiments of this application, the correspondence may be bidirectional. To be specific, the correspondence from at least one second AL in the second AL set to at least one first AL in the first AL set is the same as the correspondence from at least one first AL in the first AL set to at least one second AL in the second AL set. After determining the third AL corresponding to the detected first PDCCH candidate (that is, detecting the first DCI on one or more PDCCH candidates corresponding to the third AL), the terminal device may determine the value of the fourth AL based on the correspondence, and then monitor one or more fourth PDCCH candidates corresponding to the value of the fourth AL. Alternatively, after determining the fifth AL corresponding to the detected second PDCCH candidate (that is, detecting the second DCI on one or more fifth PDCCH candidates corresponding to the fifth AL), the terminal device may determine the value of the sixth AL based on the correspondence, and then monitor one or more sixth PDCCH candidates corresponding to the value of the sixth AL. That is, the correspondence is bidirectional and has no directivity. The terminal device does not need to determine whether detected DCI is the first DCI or the second DCI. That is, when the correspondence is bidirectional, a monitoring sequence of the terminal device is not limited. To be specific, the terminal device may first detect the first DCI (the third AL), or may first detect the second DCI (the fifth AL).

It should be noted that, when the correspondence is a correspondence from at least one first AL in the first AL set to at least one second AL in the second AL set, that is, when the correspondence is a correspondence from the first AL to the second AL, an occasion at which the terminal device detects at least one of the plurality of first PDCCH candidates is earlier than an occasion at which the terminal device detects at least one of the plurality of second PDCCH candidates, that is, a monitor occasion of the third PDCCH candidate is earlier than that of the plurality of second PDCCH candidates. An occasion at which the terminal device detects the first DCI needs to be earlier than an occasion at which the terminal device detects the second DCI. If the terminal device first detects the second DCI, because the correspondence is a correspondence from the value of the first AL of the first DCI to the value of the second AL of the second DCI, even if the terminal device first detects the second DCI and determines the second AL corresponding to the detected second PDCCH candidate, the terminal device cannot determine the at least one first AL by using the correspondence.

When the correspondence is a correspondence from at least one second AL in the second AL set to at least one first AL in the first AL set, that is, when the correspondence is a correspondence from the second AL to the first AL, an occasion at which the terminal device detects at least one of the plurality of second PDCCH candidates is earlier than an occasion at which the terminal device detects at least one of the plurality of first PDCCH candidates. That is, a monitor occasion of the fifth PDCCH candidate is earlier than that of the plurality of first PDCCH candidates. That is, an occasion at which the terminal device detects the second DCI needs to be earlier than an occasion at which the terminal device detects the first DCI. If the terminal device first detects the first DCI, because the correspondence is a correspondence from the value of the second AL of the second DCI to the value of the first AL of the first DCI, even if the terminal device first detects the first DCI and determines the first AL corresponding to the detected first PDCCH candidate, the terminal device cannot determine the at least one second AL by using the correspondence.

When the correspondence is bidirectional, an occasion at which the terminal device detects at least one of the plurality of first PDCCH candidates may be earlier than an occasion at which the terminal device detects at least one of the plurality of second PDCCH candidates, that is, a monitor occasion of the third PDCCH candidate may be earlier than that of the plurality of second PDCCH candidates. Alternatively, an occasion at which the terminal device detects at least one of the plurality of first PDCCH candidates may be later than an occasion at which the terminal device detects at least one of the plurality of second PDCCH candidates. That is, a monitor occasion of the fifth PDCCH candidate is earlier than that of the plurality of first PDCCH candidates. That is, the terminal device may first detect the first DCI, or may first detect the second DCI. If the terminal device first detects the first DCI, the terminal device may determine the at least one fourth AL based on the correspondence and the first AL (that is, the third AL) corresponding to the detected first PDCCH candidate, and then monitor the second DCI on the fourth PDCCH candidate associated with the at least one fourth AL. If the terminal device first detects the second DCI, the terminal device may determine the at least one sixth AL based on the correspondence and the second AL (that is, the fifth AL) corresponding to the detected second PDCCH candidate, and then monitor the first DCI on the sixth PDCCH candidate associated with the at least one sixth AL.

Optionally, in some embodiments of this application, the first AL set and the second AL set each include at least one value, and the correspondence includes at least one of the following:

one first AL in the first AL set corresponds to one second AL in the second AL set, one first AL in the first AL set corresponds to a plurality of second ALs in the second AL set, a plurality of first ALs in the first AL set correspond to a plurality of second ALs in the second AL set, one second AL in the second AL set corresponds to one first AL in the first AL set, and one second AL in the second AL set corresponds to a plurality of first ALs in the first AL set. The value of the first AL may be any value included in the first AL set, and the value of the second AL may be any value included in the second AL set.

Specifically, in this embodiment of this application, the first AL set includes at least one value, and the second AL set includes at least one value. An example in which the preconfigured first AL set is {1, 2, 4, 8, 16} and the preconfigured second AL set is {1, 2, 4, 8, 16} is used for description.

It is assumed that one first AL in the first AL set corresponds to one second AL in the second AL set. For example, the correspondence may be as follows: The value 1 in the first AL set corresponds to the value 1 in the second AL set, the value 2 in the first AL set corresponds to the value 2 in the second AL set, the value 4 in the first AL set corresponds to the value 4 in the second AL set, the value 8 in the first AL set corresponds to the value 8 in the second AL set, and the value 16 in the first AL set corresponds to the value 16 in the second AL set.

For another example, the correspondence may be as follows: The value 1 in the first AL set corresponds to the value 16 in the second AL set, the value 2 in the first AL set corresponds to the value 8 in the second AL set, the value 4 in the first AL set corresponds to the value 4 in the second AL set, the value 8 in the first AL set corresponds to the value 2 in the second AL set, and the value 16 in the first AL set corresponds to the value 1 in the second AL set.

For another example, the correspondence may be as follows: The value 1 in the first AL set corresponds to the value 8 in the second AL set, the value 2 in the first AL set corresponds to the value 16 in the second AL set, the value 4 in the first AL set corresponds to the value 1 in the second AL set, the value 8 in the first AL set corresponds to the value 4 in the second AL set, and the value 16 in the first AL set corresponds to the value 2 in the second AL set.

Optionally, the correspondence may alternatively include: One first AL in the first AL set corresponds to a plurality of second ALs in the second AL set. For example, the value 1 in the first AL set corresponds to the values 1 and 2 in the second AL set, the value 2 in the first AL set corresponds to the values 2 and 4 in the second AL set, the value 4 in the first AL set corresponds to the values 2, 4, and 8 in the second AL set, the value 8 in the first AL set corresponds to the values 8 and 16 in the second AL set, and the value 16 in the first AL set corresponds to the values 8 and 16 in the second AL set.

Optionally, the correspondence may alternatively include: One second AL in the second AL set corresponds to a plurality of first ALs in the first AL set. For example, the value 1 in the second AL set corresponds to the values 1 and 2 in the first AL, the value 2 in the second AL set corresponds to the values 2, 4, and 8 in the first AL set, the value 4 in the second AL set corresponds to the values 2, 4, and 8 in the first AL set, the value 8 in the second AL set corresponds to the values 8 and 16 in the first AL set, and the value 16 in the second AL set corresponds to the values 4, 8, and 16 in the first AL set.

Optionally, the correspondence may alternatively include: One second AL in the second AL set corresponds to one first AL in the first AL set. For example, the value 1 in the second AL set corresponds to the value 2 in the first AL, the value 2 in the second AL set corresponds to the value 8 in the first AL set, the value 4 in the second AL set corresponds to the value 4 in the first AL set, the value 8 in the second AL set corresponds to the value 16 in the first AL set, and the value 16 in the second AL set corresponds to the value 16 in the first AL set.

Optionally, the correspondence may alternatively include: One value of the second AL corresponds to a plurality of values of the first AL. For example, the value 1 of the second AL corresponds to the value 2 of the first AL, the value 2 of the second AL corresponds to the value 2 of the second AL, the value 4 of the second AL corresponds to the value 4 of the first AL, the value 8 of the second AL corresponds to the value 8 of the first AL, and the value 16 of the second AL corresponds to the value 16 of the first AL.

Optionally, the correspondence may alternatively include: A plurality of first ALs in the first AL set corresponds to a plurality of second ALs in the second AL set. For example, the values 1 and 2 in the first AL set corresponds to the values 1 and 2 in the second AL set, the values 2 and 4 in the first AL set corresponds to the values 2 and 4 in the second AL set, the values 4 and 8 in the first AL set corresponds to the values 2, 4, and 8 in the second AL set, the values 8 and 16 in the first AL set corresponds to the values 8 and 16 in the second AL set, and the values 8 and 16 in the first AL set corresponds to the values 4, 8, and 16 in the second AL set.

It should be understood that the correspondences between values in the foregoing examples are merely examples, and should not be construed as any limitation on a correspondence between a value in the first AL set and a value in the second AL set.

It should be further understood that the foregoing correspondences may be unidirectional, that is, a correspondence from a first AL in the first AL set to a second AL in the second AL set, or a correspondence from a second AL in the second AL set to a first AL in the first AL set. Optionally, the foregoing correspondences may be alternatively bidirectional. To be specific, regardless of whether the first DCI or the second DCI is detected, an AL of the other DCI may be determined based on the correspondence. This is not limited herein in this embodiment of this application.

The following provides descriptions with reference to a specific example.

Figure 16:
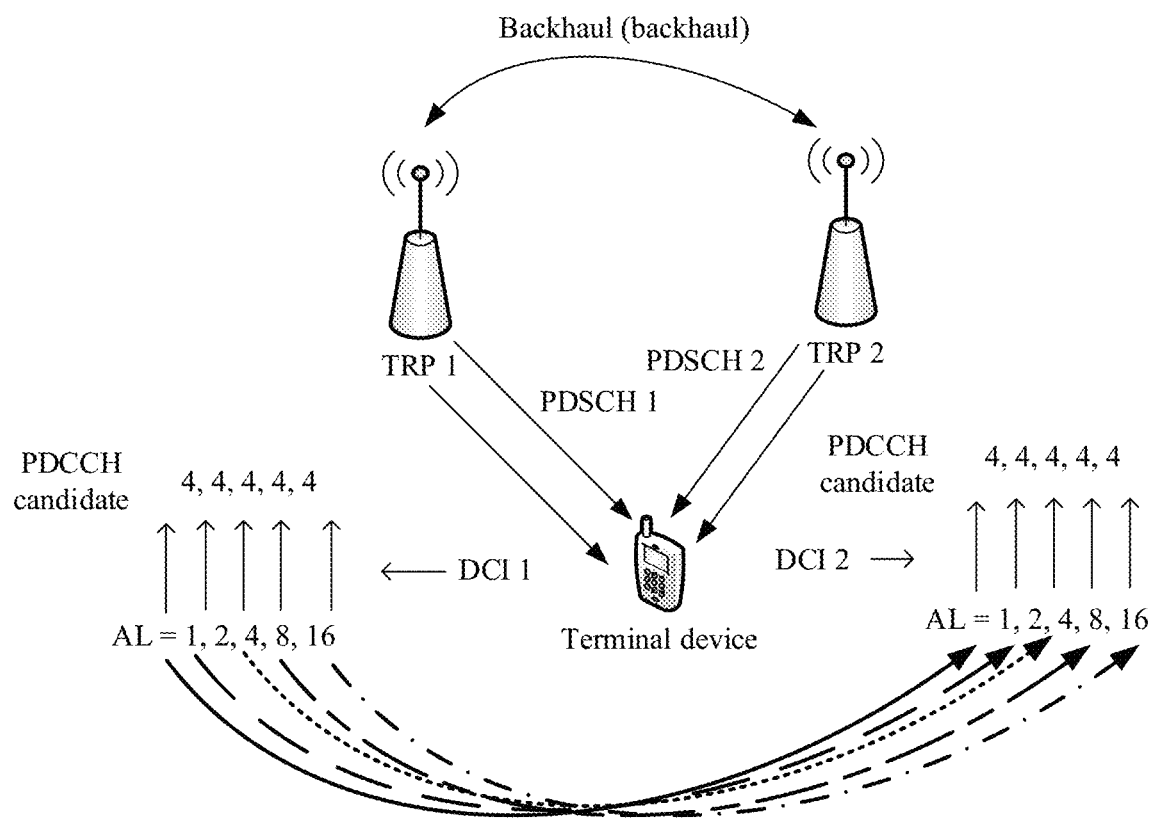
FIG. 16 is a schematic diagram of determining, based on a correspondence between ALs corresponding to two pieces of DCI, a PDCCH candidate on which blind detection needs to be performed according to some embodiments of this application.

FIG. 16 is a schematic diagram of determining, based on a correspondence between ALs corresponding to two pieces of DCI, a PDCCH candidate on which blind detection needs to be performed according to some embodiments of this application. As shown in FIG. 16, the preconfigured first AL set is {1, 2, 4, 8, 16}, and the preconfigured second AL set is {1, 2, 4, 8, 16}. The correspondence is a correspondence from a value of a first AL in the first AL set to a value of a second AL in the second AL set. It is assumed that the correspondence is specifically as follows: The value 1 in the first AL set corresponds to the value 1 in the second AL set, the value 2 in the first AL set corresponds to the value 2 in the second AL set, the value 4 in the first AL set corresponds to the value 4 in the second AL set, the value 8 in the first AL set corresponds to the value 8 in the second AL set, and the value 16 in the first AL set corresponds to the value 16 in the second AL set. A quantity of PDCCH candidates corresponding to all the AL values in the first AL set is 4. A quantity of PDCCH candidates corresponding to all the AL values in the second AL set is 4.

In step S110, the network device first determines the correspondence. In step S120, if a first AL used by the network device for sending the first DCI at a monitor occasion of the terminal device is 1, a second AL used by the network device for sending the second DCI at the monitor occasion is also 1. To be specific, if the network device sends the first DCI at transmission locations on four PDCCH candidates corresponding to the first AL of 1, the network device also sends the second DCI at transmission locations on four PDCCH candidates corresponding to the second AL of 1. If a first AL used by the network device for sending the first DCI at a monitor occasion of the terminal device is 4, a second AL used by the network device for sending the second DCI at the monitor occasion is also 1. To be specific, if the network device sends the first DCI at transmission locations on four PDCCH candidates corresponding to the first AL of 4, the network device also sends the second DCI at transmission locations on four PDCCH candidates corresponding to the second AL of 4.

In step S130, the terminal device first monitors the first DCI. The terminal device needs to traverse all possible values of the first AL. The first AL set is {1, 2, 4, 8, 16}. It is assumed that the terminal device detects the first DCI when the first AL is 1, that is, the value of the third AL is 1. Based on the foregoing correspondence, it may be determined that the value of the second AL is 1, that is, the value of the fourth AL is 1. To be specific, the terminal device needs to monitor the second DCI only on four PDCCH candidates corresponding to the fourth AL whose value is 1. The fourth AL is one or more values in the preconfigured second AL set {1, 2, 4, 8, 16}. The terminal device does not need to perform blind detection on the second DCI on PDCCH candidates corresponding to each of possible values 2, 4, 8, and 16 of the second AL, so that a quantity of times of blind detection performed by the terminal device can be reduced by 16 times. Therefore, a quantity of times of blind detection performed by the terminal device can be greatly reduced, and complexity of blind detection on the second DCI is reduced. It is assumed that the terminal device detects the first DCI when the first AL is 4, that is, the value of the third AL is 1. Based on the foregoing correspondence, it may be determined that the value of the second AL is 4, that is, the value of the fourth AL is 4. To be specific, the terminal device needs to monitor the second DCI only on four PDCCH candidates corresponding to the four AL whose value is 4, without performing blind detection on the second DCI on four PDCCH candidates corresponding to each of the possible values 1, 2, 8, and 16 of the second AL. Therefore, a quantity of times of blind detection performed by the terminal device can be greatly reduced, and complexity of blind detection on the second DCI is reduced.

It should be understood that, if the terminal device detects the first DCI when the first AL is 1 and when the first AL is 2, that is, the values of the third AL are 1 and 2, the terminal device may select a larger or smaller one of the plurality of values of the third AL, and determine the fourth AL by using the larger or smaller value and with reference to the correspondence. Alternatively, the terminal device may determine the fourth AL by separately using the values 1 and 2 of the third AL and with reference to the correspondence. For example, when the larger value is used, the fourth AL determined with reference to the correspondence is 2. When the smaller value is used, the fourth AL determined with reference to the correspondence is 1. When each of the plurality of values of the third AL is used, the fourth ALs determined with reference to the correspondence are 1 and 2, and the terminal device needs to perform blind detection on the second DCI on PDCCH candidates corresponding to the second ALs 1 and 2.

It should be understood that, in the embodiments of this application, payload sizes (payload size) of the first DCI and the second DCI may be the same or different. This is not limited herein in this embodiment of this application.

It should be further understood that the first AL included in the first AL set is related to a payload size of the first DCI, channel quality, and the like. The second AL included in the second AL set is related to a payload size of the second DCI, channel quality, and the like. Therefore, when the network device configures or predefines the foregoing correspondence, factors such as the payload sizes of the first DCI and the second DCI and the channel quality need to be considered. For example, it is assumed that the network device expects that a link for transmitting the first DCI and a link for transmitting the second DCI during multi-TRP transmission have a same SINR level, and the payload size of the first DCI is twice that of the second DCI. In this case, it may be configured or predefined that the first AL 2 in the first AL set corresponds to the second AL 1 in the second AL set. It is assumed that the network device expects that two links during multi-TRP transmission have a same SINR level, and the payload size of the first DCI is twice that of the second DCI. In this case, the correspondence may be configured or predefined as follows: The first AL 2 in the first AL set corresponds to the second AL 1 in the second AL set, and the first AL 4 in the first AL set corresponds to the second ALs 1, 2, and 4 in the second AL set; or the second AL 1 in the second AL set corresponds to the first ALs 1, 2, and 4 in the first AL set; or the second AL 2 in the second AL set corresponds to the first ALs 2, 4, and 8 in the first AL set; or the like. This is not limited herein in this embodiment of this application.

It should be understood that the foregoing examples should not be construed as any limitation on this embodiment of this application. For example, the correspondence may be alternatively a one-to-many or many-to-many correspondence. The one-to-many or many-to-many correspondence may be unidirectional, that is, a correspondence from a value of a first AL in the first AL set to a value of a second AL in the second AL set. The one-to-many or many-to-many correspondence may be alternatively bidirectional. This is not limited herein in this embodiment of this application.

Figure 17:
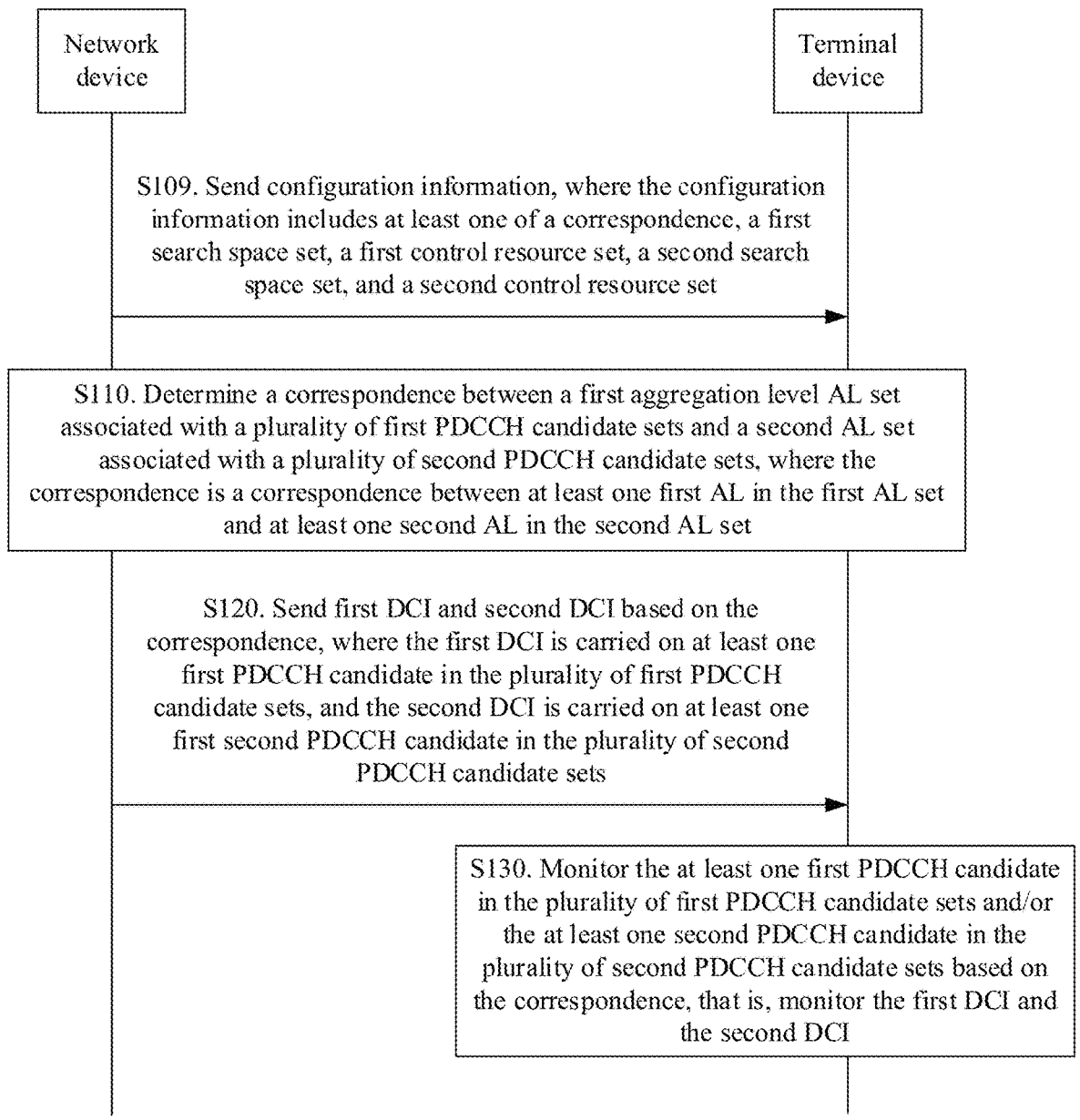
FIG. 17 is a schematic interaction diagram of an information transmission method according to an embodiment of this application.

FIG. 17 is a schematic interaction diagram of an information transmission method according to some embodiments of this application. In some embodiments, based on the method steps shown in FIG. 13, the method 300 further includes the following steps.

S109. The network device sends configuration information to the terminal device. The configuration information includes at least one of the correspondence, a first search space set, a first control resource set, a second search space set, and a second control resource set.

The first search space set includes indication information of the first AL set. The first control resource set includes time-frequency resource configuration information of the plurality of first PDCCH candidates. The second search space set includes indication information of the second AL set. The second control resource set includes time-frequency resource configuration information of the plurality of second PDCCH candidates. Correspondingly, the terminal device receives the configuration information.

Specifically, for descriptions of steps S110 to S130 shown in FIG. 17, refer to the descriptions of steps S110 to S130 in FIG. 13. For brevity, details are not described herein again.

The terminal device needs to perform blind detection on the first DCI and/or the second DCI based on the correspondence. Therefore, the terminal device needs to learn of a time-frequency resource location occupied by the first DCI, a time-frequency resource location occupied by the second DCI, and the correspondence. Therefore, in step S109, the network device notifies the terminal device of the foregoing information. Specifically, the network device may send the configuration information to the terminal device. The configuration information includes at least one of the correspondence, the first search space set, the first control resource set, the second search space set, and the second control resource set.

Specifically, the first search space set (Search space set) may include the indication information of the first AL set. For example, the indication information of the first AL set may be used to indicate a value of a first AL included in the first AL set or a quantity of first PDCCH candidates included in the plurality of first PDCCH candidates. The quantity of first PDCCH candidates included in the plurality of first PDCCH candidates may be a maximum quantity of PDCCH candidates supported by the terminal device. The first control resource set (CORESET) may include time-frequency location information of the plurality of first PDCCH candidates.

The plurality of first PDCCH candidates are associated with the first AL set. The first search space set may further include a payload size of the first DCI, a monitoring periodicity of the first DCI, a format of the first DCI, an index number of the first CORESET, and the like. The index number of the first CORESET indicates that the first search space set is associated with the first CORESET, and is used to indicate the terminal device to monitor the first DCI on a time-frequency resource of the first CORESET in a monitoring manner configured in the first search space set.

The second search space set (Search space set) may include the indication information of the second AL set. For example, the indication information of the second AL set is used to indicate a value of a second AL included in the second AL set or a quantity of second PDCCH candidates included in the plurality of second PDCCH candidates. The quantity of second PDCCH candidates included in the plurality of second PDCCH candidates may be a maximum quantity of PDCCH candidates supported by the terminal device. The second CORESET may include time-frequency location information of the plurality of second PDCCH candidates. The plurality of second PDCCH candidates are associated with the second AL set. The second search space set may further include a payload size of the second DCI, a monitoring periodicity of the second DCI, a format of the second DCI, an index number of the second CORESET, and the like. The index number of the second CORESET indicates that the second search space set is associated with the second CORESET, and is used to indicate the terminal device to monitor the second DCI on a time-frequency resource of the second CORESET in a monitoring manner configured in the second search space set.

The plurality of first PDCCH candidates correspond to a plurality of first ALs. The plurality of second PDCCH candidates correspond to a plurality of second ALs. A correspondence is established between an AL of a first PDCCH candidate and an AL of a second PDCCH candidate.

Configuration information of the first DCI corresponds to a plurality of first ALs. Configuration information of the second DCI corresponds to a plurality of second ALs. A correspondence is established between an AL of the first DCI and an AL of the second DCI.

The plurality of first PDCCH candidates correspond to a first time-frequency resource set. The plurality of second PDCCH candidates correspond to a second time-frequency resource set. The first DCI is carried on the first time-frequency resource set. The second DCI is carried on the first time-frequency resource set. In this case, the terminal device monitors the first DCI on the first time-frequency resource set, and monitors the second DCI on the second time-frequency resource set. The first time-frequency resource set and the second time-frequency resource set are located on a same carrier or a same bandwidth part.

Optionally, the configuration information may further include information about the correspondence between at least one first AL in the first AL set and at least one second AL in the second AL set, for example, whether the correspondence is unidirectional or bidirectional, and if the correspondence is unidirectional, whether the correspondence is a correspondence from at least one first AL in the first AL set to at least one second AL in the second AL set, or a correspondence from at least one second AL in the second AL set to at least one first AL in the first AL set.

Optionally, in some embodiments of this application, the correspondence may be alternatively predefined in a protocol, that is, the configuration information may not include the correspondence.

Optionally, in some embodiments of this application, index values of the first control resource set and the second control resource set are different. That the index values of the first control resource set and the second control resource set are different indicates that the first DCI and the second DCI occupy different time-frequency resources, that is, time-frequency resources occupied by a control resource set of the first DCI and a control resource set of the second DCI do not overlap.

Optionally, in some embodiments of this application, index values of the first control resource set and the second control resource set are the same, that is, the first DCI and the second DCI occupy a same time-frequency resource. To be specific, time-frequency resources occupied by a control resource set of the first DCI and a control resource set of the second DCI partially overlap or fully overlap.

Optionally, in some embodiments of this application, the first AL set includes at least one of 1, 2, 4, 8, and 16, and the second AL set includes at least one of 1, 2, 4, 8, and 16.

For example, the first AL set is {1, 2, 4, 8}, or the first AL set is {1, 2, 4, 8, 16}, or the first AL set is {2, 4, 8, 16}; and the second AL set is {1, 2, 4, 8}, or the second AL set is {2, 4, 8, 16}, or the first AL set is {2, 4, 8}. This is not limited herein in this embodiment of this application.

It should be understood that, in addition to 1, 2, 4, 8, and 16, the first AL set may further include another value, and the second AL set may also include another value. This is not limited herein in this embodiment of this application.

Figure 18:
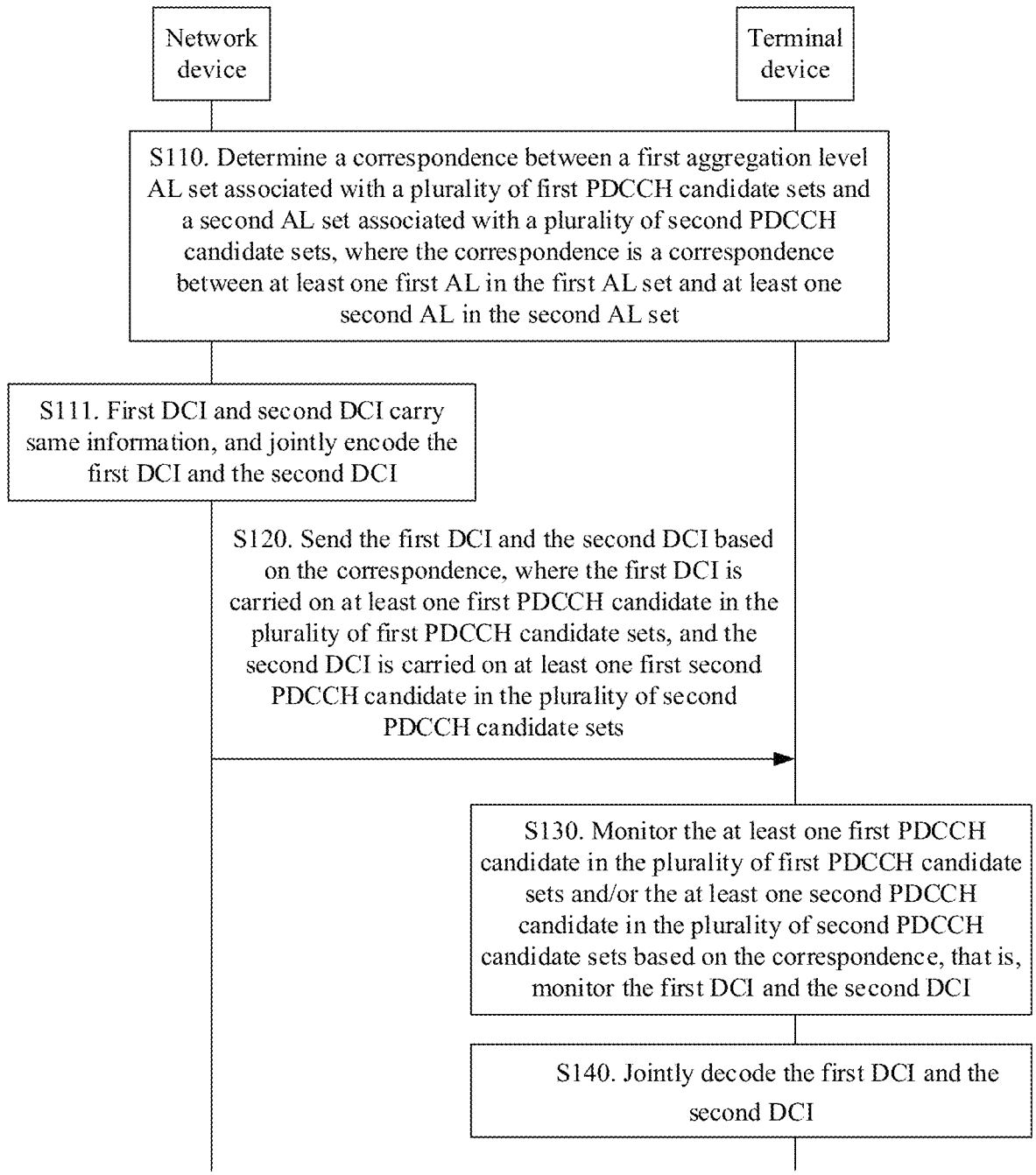
FIG. 18 is a schematic interaction diagram of an information transmission method according to another embodiment of this application.

FIG. 18 is a schematic interaction diagram of an information transmission method according to some embodiments of this application. In some embodiments, the first DCI and the second DCI carry same information (to be specific, the first AL of the first DCI is the same as the first AL of the second DCI, and an information bit length of the first DCI is the same as that of the second DCI). Based on the method steps shown in FIG. 13, the method 300 further includes the following steps.

S111. The network device jointly encodes the first DCI and the second DCI.

S140. The terminal device jointly decodes the detected first DCI and second DCI.

Specifically, for descriptions of steps S110 to S130 shown in FIG. 18, refer to the descriptions of steps S110 to S130 in FIG. 13. For brevity, details are not described herein again.

If the first DCI and the second DCI carry identical control information, a purpose of transmission by using the two pieces of DCI is to improve robustness of PDCCH transmission. It may be predefined or configured that the first DCI and the second DCI are same DCI when the first DCI and the second DCI carry identical control information. In step S111, the network device may jointly encode the first DCI and the second DCI. In step S140, the terminal device may jointly decode the detected first DCI and second DCI.

Optionally, the jointly decoding the first DCI and the second DCI in step S140 includes:
determining a quantity of monitored PDCCH candidates in a first monitoring time unit, where a quantity of monitored PDCCH candidates corresponding to a PDCCH candidate quantity X of the first DCI and a PDCCH candidate quantity Y of the second DCI is less than X+Y, and the first monitoring unit is a time unit for monitoring the first DCI and the second DCI.

Optionally, the quantity of monitored PDCCH candidates that is determined in the first monitoring time unit is a sum of a first AL corresponding to a largest quantity of PDCCH candidates in a quantity of PDCCH candidates of the at least one first AL and a second AL corresponding to a largest quantity of PDCCH candidates in a quantity of PDCCH candidates of the at least one second AL. For example, two values of the first AL are 1 and 2, a quantity of PDCCH candidates corresponding to the first AL with a value of 1 is x1, a quantity of PDCCH candidates corresponding to the first AL with a value of 2 is x2, two values of the second AL are 1 and 2, a quantity of PDCCH candidates corresponding to the second AL with a value of 1 is x3, a quantity of PDCCH candidates corresponding to the first AL with a value of 2 is x4, and the two values of the first AL correspond to the two values of the second AL. For example, the value 1 of the first AL corresponds to the value 1 of the second AL, and the value 2 of the first AL corresponds to the value 2 of the second AL. In this case, the quantity of monitored PDCCH candidates that is determined in the first monitoring time unit is max(x1, x2)+max(x3, x4).

Figure 19:
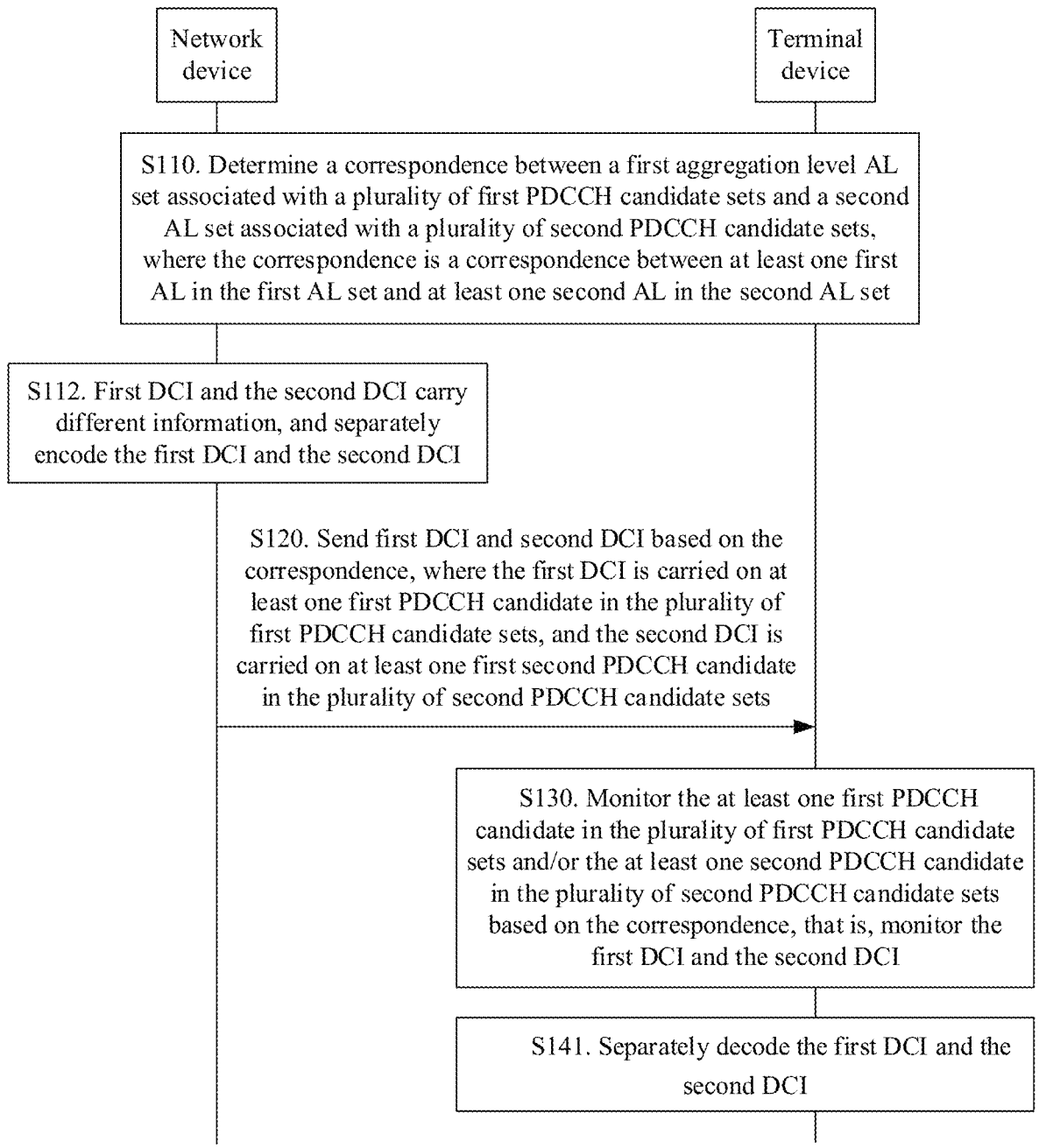
FIG. 19 is a schematic interaction diagram of an information transmission method according to an embodiment of this application.

FIG. 19 is a schematic interaction diagram of an information transmission method according to some embodiments of this application. In some embodiments, the first DCI and the second DCI carry different information. Based on the method steps shown in FIG. 13, the method 300 further includes the following steps.

S112. The network device separately encodes the first DCI and the second DCI.

S141. The terminal device separately decodes the detected first DCI and second DCI.

Specifically, for descriptions of steps S110 to S130 shown in FIG. 19, refer to the descriptions of steps S110 to S130 in FIG. 13. For brevity, details are not described herein again.

If the first DCI and the second DCI carry different control information, the first DCI and the second DCI are different DCI. In step S112, the network device separately encodes the first DCI and the second DCI. In step S141, the terminal device may separately decode the detected first DCI and second DCI.

In this case, the first AL of the first DCI and the first AL of the second DCI may be the same or different.

In this case, an information bit length of the first DCI and an information bit length of the second DCI may be the same or different.

In a process of separately decoding the first DCI and the second DCI, when the terminal device determines the quantity of monitored PDCCH candidates in the first monitoring time unit, a quantity of monitored PDCCH candidates corresponding to a PDCCH candidate quantity X of the first DCI and a PDCCH candidate quantity Y of the second DCI is equal to X+Y.

Optionally, when determining whether the detected first DCI and second DCI need to be jointly decoded, the terminal device may perform determining based on the correspondence.

For example, when the correspondence is a one-to-one correspondence, and a value of a first AL is the same as a value of an associated second AL, the terminal device determines that the detected first DCI and second DCI need to be jointly decoded. For example, the correspondence between at least one first AL in the first AL set and at least one second AL in the second AL set is a one-to-one correspondence, AL=1 in the first AL set corresponds to AL=1 in the second AL set, AL=2 in the first AL set corresponds to AL=2 in the second AL set, AL=4 in the first AL set corresponds to AL=4 in the second AL set, and AL=8 in the first AL set corresponds to AL=8 in the second AL set. In this case, the terminal device determines that the detected first DCI and second DCI need to be jointly decoded.

For another example, when the correspondence is a one-to-many or many-to-many correspondence, if the terminal device determines that one or more of values of at least one first AL is the same as one or more of values of at least one second AL, the terminal device determines that the detected first DCI and second DCI need to be jointly decoded. For example, the value 1 in the first AL set corresponds to the values 1 and 2 in the second AL set, the value 2 in the first AL set corresponds to the values 2 and 4 in the second AL set, the value 4 in the first AL set corresponds to the values 2, 4, and 8 in the second AL set, the value 8 in the first AL set corresponds to the values 8 and 16 in the second AL set, and the value 16 in the first AL set corresponds to the values 8 and 16 in the second AL set. In this case, the terminal device determines that the detected first DCI and second DCI need to be jointly decoded.

It should be understood that the terminal device may alternatively determine, in another manner rather than based on the correspondence, whether the detected first DCI and second DCI need to be jointly decoded. For example, the network device may notify the terminal device of whether the first DCI and the second DCI need to be jointly decoded. This is not limited herein in this embodiment of this application.

In the information transmission method provided in this application, when monitoring a plurality of pieces of DCI, the terminal device may determine, based on a correspondence between ALs corresponding to the plurality of pieces of DCI, an AL corresponding to DCI that needs to be monitored, and then monitor the DCI on a PDCCH candidate corresponding to the AL. Therefore, a quantity of times of blind detection on the DCI can be reduced, and complexity of blind detection on the DCI is reduced. Further, communication efficiency and communication resource utilization are improved.

It should be understood that, in the embodiments of this application, the "first", the "second", and the like are merely intended to indicate that a plurality of objects are different. For example, the first DCI and the second DCI are merely intended to indicate different DCI, without any impact on the DCI. The "first", the "second", and the like should not be construed as any limitation on the embodiments of this application.

It should be further understood that, the foregoing descriptions are merely intended to help a person skilled in the art better understand the embodiments of this application, instead of limiting the scope of the embodiments of this application. It is clear that a person skilled in the art may make various equivalent modifications or changes based on the foregoing examples. For example, some steps in the embodiments of the foregoing method may not be required, or some steps may be added. Alternatively, any two or more of the foregoing embodiments are combined. A modified, changed, or combined solution also falls within the scope of the embodiments of this application.

It should be further understood that the foregoing descriptions of the embodiments of this application emphasize differences between the embodiments. For same or similar parts that are not mentioned, refer to the embodiments. For brevity, details are not described herein again.

It should be further understood that sequence numbers of the processes do not mean execution sequences in the foregoing embodiments. The execution sequences of the processes should be determined based on functions and internal logic of the processes, and should not be construed as any limitation on the implementation processes of the embodiments of this application.

It should be further understood that, in the embodiments of this application, "presetting" and "predefining" may be implemented by prestoring corresponding code or a corresponding table on a device (for example, including the terminal device and the network device), or in another manner that may be used to indicate related information. A specific implementation thereof is not limited in this application.

It should be further understood that the division of the manners, cases, categories, and embodiments in the embodiments of this application is merely intended for ease of description, and should not constitute a particular limitation. The features in the manners, categories, cases, and embodiments may be combined without contradiction.

It should be further understood that, in the embodiments of this application, unless there is a particular description or a logical collision, terms and/or descriptions in different embodiments are consistent and may be mutually referenced. Technical features in different embodiments may be combined based on their internal logical relationship to form a new embodiment.

The foregoing describes in detail the information transmission method in the embodiments of this application with reference to FIG. 1 to FIG. 19. The following describes in detail a communications apparatus in the embodiments of this application with reference to FIG. 20 to FIG. 25.

Figure 20:
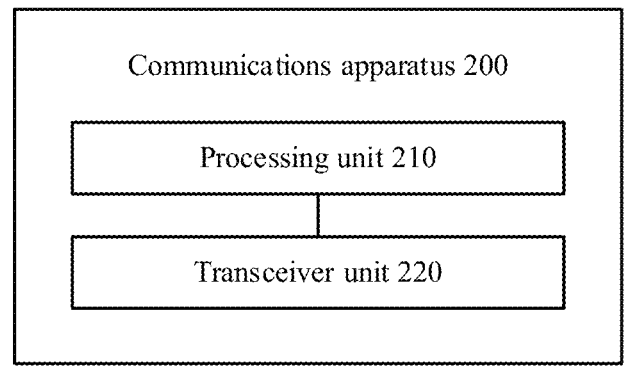
FIG. 20 is a schematic block diagram of a communications apparatus according to an embodiment of this application.

FIG. 20 is a schematic block diagram of a communications apparatus 300 according to an embodiment of this application. The apparatus 300 may correspond to the terminal device described in the method 100, or may be a chip or a component used in the terminal device. In addition, modules or units in the apparatus 200 are separately configured to perform the actions or the processing processes performed by the terminal device in the method 100. As shown in FIG. 17, the apparatus 200 may include a processing unit 210 and a transceiver unit 220. The transceiver unit 220 is configured to specifically send or receive a signal under driving by the processing unit 210.

The processing unit 210 is configured to determine a correspondence between a first aggregation level AL set associated with a plurality of first downlink control channel PDCCH candidates and a second AL set associated with a plurality of second PDCCH candidates. The correspondence is a correspondence between at least one first AL in the first AL set and at least one second AL in the second AL set.

The processing unit 210 is further configured to monitor at least one of the plurality of first PDCCH candidates and/or at least one of the plurality of second PDCCH candidates based on the correspondence.

When monitoring a plurality of pieces of DCI, the communications apparatus provided in this embodiment of this application may determine, based on a correspondence between ALs corresponding to the plurality of pieces of DCI, an AL corresponding to DCI that needs to be monitored, and then monitor the DCI on a PDCCH candidate corresponding to the AL, without monitoring the DCI on PDCCH candidates corresponding to all possible ALs of each piece of DCI. All the possible ALs are all ALs preconfigured for the DCI. Therefore, a quantity of times of blind detection on the DCI can be reduced, and complexity of blind detection on the DCI is reduced. Further, communication efficiency and communication resource utilization are improved.

Optionally, in some embodiments of this application, the correspondence is a correspondence between at least one first AL in the first AL set and at least one second AL in the second AL set, and the processing unit 210 is specifically configured to:
  determine a third AL of a third PDCCH candidate in the plurality of first PDCCH candidates, where the third AL belongs to the first AL set;
  determine at least one fourth AL based on the correspondence, where the at least one fourth AL is one or more values in the second AL set; and
  monitor a fourth PDCCH candidate associated with the at least one fourth AL, where the fourth PDCCH candidate is at least one of the plurality of second PDCCH candidates.

Optionally, in some embodiments of this application, the correspondence is a correspondence between at least one second AL in the second AL set and at least one first AL in the first AL set, and the processing unit 210 is specifically configured to:
  determine a fifth AL of a fifth PDCCH candidate in the plurality of second PDCCH candidates, where the fifth AL is one value in the second AL set;
  determine at least one sixth AL based on the correspondence, where the at least one sixth AL is one or more values in the first AL set; and
  monitor a sixth PDCCH candidate associated with the at least one sixth AL, where the sixth PDCCH candidate is at least one of the plurality of first PDCCH candidates.

Optionally, in some embodiments of this application, a monitor occasion at which the processing unit 210 monitors the third PDCCH candidate is earlier than a monitor occasion of the plurality of second PDCCH candidates; or a monitor occasion at which the processing unit 210 monitors the fifth PDCCH candidate is earlier than a monitor occasion of the plurality of first PDCCH candidates.

Optionally, in some embodiments of this application, the correspondence includes at least one of the following:
  one first AL in the first AL set corresponds to one second AL in the second AL set, one first AL in the first AL set corresponds to a plurality of second ALs in the second AL set, a plurality of first ALs in the first AL set correspond to a plurality of second ALs in the second AL set, one second AL in the second AL set corresponds to one first AL in the first AL set, and one second AL in the second AL set corresponds to a plurality of first ALs in the first AL set.

Optionally, in some embodiments of this application, the processing unit 210 is specifically configured to monitor first DCI on the at least one of the plurality of first PDCCH candidates, and monitor second DCI on the at least one of the plurality of second PDCCH candidates. The first DCI is used to schedule first data, and the second DCI is used to schedule second data.

Optionally, in some embodiments of this application, the first data and the second data are located on a same carrier or a same bandwidth part, and/or the first DCI and the DCI are located on a same carrier or a same bandwidth part.

Optionally, in some embodiments of this application, the plurality of first PDCCH candidates correspond to a first time-frequency resource set, the plurality of second PDCCH candidates correspond to a second time-frequency resource set, the first DCI is carried on the first time-frequency resource set, the second DCI is carried on the second time-frequency resource set, and the processing unit 210 is specifically configured to monitor the first DCI on the first time-frequency resource set, and monitor the second DCI on the second time-frequency resource set. The first time-frequency resource set and the second time-frequency resource set are located on a same carrier or a same bandwidth part, and/or the first DCI and the DCI are located on a same carrier or a same bandwidth part.

Optionally, in some embodiments of this application, the transceiver unit 220 is configured to receive configuration information. The configuration information includes at least one of the correspondence, a first search space set, a first control resource set, a second search space set, and a second control resource set.

Configuration information of the first search space set includes indication information of the first AL set. Configuration information of the second search space set includes indication information of the second AL set. The first control resource set includes time-frequency resource configuration information of the plurality of first PDCCH candidates. The second control resource set includes time-frequency resource configuration information of the plurality of second PDCCH candidates.

Optionally, in some embodiments of this application, index values of the first control resource set and the second control resource set are different.

Optionally, in some embodiments of this application, a first receive beam for receiving the first DCI on the first control resource set is different from a second receive beam for receiving the second DCI on the second control resource set.

Optionally, in some embodiments of this application, the first AL set and/or the second AL set include/includes at least one of 1, 2, 4, 8, and 16.

Optionally, in some embodiments of this application, a first AL of the first DCI is the same as a second AL of the second DCI, an information bit length of the first DCI is the same as that of the second DCI, and the processing unit 210 is further configured to jointly decode the first DCI and the second DCI.

Optionally, in some embodiments of this application, the processing unit 210 is specifically configured to determine a quantity of monitored PDCCH candidates in a first monitoring time unit. A quantity of monitored PDCCH candidates corresponding to a PDCCH candidate quantity X of the first DCI and a PDCCH candidate quantity Y of the second DCI is less than X+Y.

Optionally, in some embodiments of this application, a first AL of the first DCI is different from a second AL of the second DCI, and the processing unit 210 is further configured to separately decode the first DCI and the second DCI.

Optionally, in some embodiments of this application, the processing unit 210 is specifically configured to determine a quantity of monitored PDCCH candidates in a first monitoring time unit. A quantity of monitored PDCCH candidates corresponding to a PDCCH candidate quantity X of the first DCI and a PDCCH candidate quantity Y of the second DCI is equal to X+Y.

Further, the apparatus 200 may further include a storage unit 230, and the transceiver unit 220 may be a transceiver, an input/output interface, or an interface circuit. The storage unit 230 is configured to store instructions to be executed by the transceiver unit 220 and the processing unit 210. The transceiver unit 220, the processing unit 210, and the storage unit 230 are coupled to each other. The storage unit 230 stores instructions. The processing unit 210 is configured to execute the instructions stored in the storage unit 230. The transceiver unit 220 is configured to specifically send or receive a signal under driving by the processing unit 210.

It should be understood that, for a specific process in which the units in the apparatus 200 perform the foregoing corresponding steps, refer to the descriptions related to the terminal device in the related embodiments of the method 100 with reference to FIG. 13 to FIG. 19. For brevity, details are not described herein again.

Optionally, the transceiver unit 220 may include a receiving unit (module) and a sending unit (module), configured to perform the steps of receiving information and sending information by the terminal device in the embodiments of the method 100 and the embodiments shown in FIG. 13 to FIG. 19. Optionally, the communications apparatus 200 may further include a storage unit 230, configured to store instructions to be executed by the processing unit 210 and the transceiver unit 220. The processing unit 210, the transceiver unit 220, and the storage unit 230 are in communication connection. The storage unit 230 stores instructions. The processing unit 210 is configured to execute the instructions stored in the storage unit 230. The transceiver unit 220 is configured to specifically send or receive a signal under driving by the processing unit 210.

Figure 21:
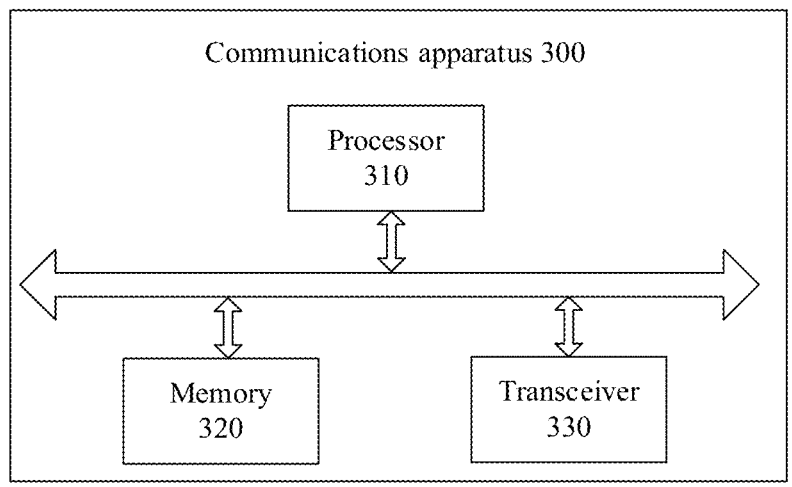
FIG. 21 is another schematic block diagram of a communications apparatus according to an embodiment of this application.

It should be understood that the transceiver unit 220 may be a transceiver, an input/output interface, or an interface circuit. The storage unit 330 may be a memory. The processing unit 210 may be implemented by a processor. As shown in FIG. 21, a communications apparatus 300 may include a processor 310, a memory 320, and a transceiver 330.

The communications apparatus 200 shown in FIG. 20 or the communications apparatus 300 shown in FIG. 21 is capable of implementing the steps performed by the terminal device in the embodiments of the method 100 and the embodiments shown in FIG. 13 to FIG. 19. For similar descriptions, refer to the descriptions in the foregoing corresponding methods. To avoid repetition, details are not described herein again.

It should be further understood that the communications apparatus 200 shown in FIG. 20 or the communications apparatus 300 shown in FIG. 21 may be a terminal device.

Figure 22:
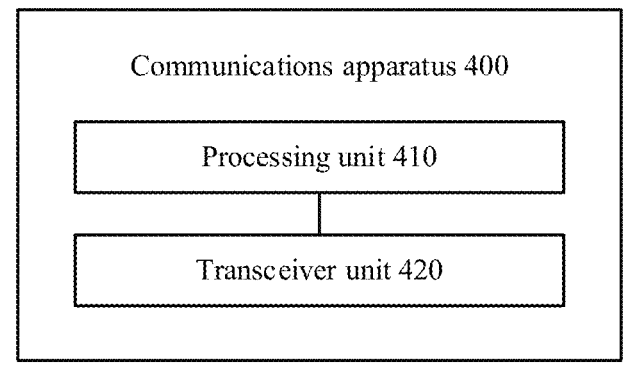
FIG. 22 is a schematic block diagram of a communications apparatus according to an embodiment of this application.

FIG. 22 is a schematic block diagram of a communications apparatus 400 according to an embodiment of this application. The apparatus 400 may correspond to the network device described in the method 100, or may be a chip or a component used in the network device. In addition, modules or units in the apparatus 400 are separately configured to perform the actions or the processing processes performed by the network device in the method 100. As shown in FIG. 22, the apparatus 400 may include a processing unit 410 and a transceiver unit 420. The transceiver unit 420 is configured to specifically send or receive a signal under driving by the processing unit 410.

The processing unit 410 is configured to determine a correspondence between a first aggregation level AL set associated with a first downlink control channel PDCCH candidate set and a second AL set associated with a plurality of second PDCCH candidates. The correspondence is a correspondence between at least one first AL in the first AL set and at least one second AL in the second AL set.

The processing unit 410 is further configured to: based on the correspondence, send first downlink control information DCI on at least one of the plurality of first PDCCH candidates, and/or send second DCI on at least one of the plurality of second PDCCH candidates.

When sending a plurality of pieces of DCI, the communications apparatus provided in this application may determine, based on a correspondence between ALs corresponding to the plurality of pieces of DCI, an AL corresponding to DCI that needs to be sent, and then send the DCI on a PDCCH candidate corresponding to the AL. Therefore, a quantity of times of blind detection on the DCI can be reduced, and complexity of blind detection on the DCI is reduced. Further, communication efficiency and communication resource utilization are improved.

Optionally, in some embodiments of this application, the correspondence is a correspondence between at least one first AL in the first AL set and at least one second AL in the second AL set, and the processing unit 410 is specifically configured to: determine a third AL corresponding to a third PDCCH candidate for sending the first DCI, where the third AL is one value in the first AL set; determine at least one fourth AL based on the correspondence, where the at least one fourth AL is one value in the second AL set; and send the second DCI on a fourth PDCCH candidate associated with the at least one fourth AL, where the fourth PDCCH candidate is at least one of the plurality of second PDCCH candidates.

Optionally, in some embodiments of this application, the correspondence is a correspondence between at least one second AL in the second AL set and at least one first AL in the first AL set, and the processing unit 410 is specifically configured to: determine a fifth AL corresponding to a fifth PDCCH candidate for sending the second DCI, where the fifth AL is one value in the second AL set; determine at least one sixth AL based on the correspondence, where the at least one sixth AL is one value in the first AL set; and send the first DCI on a sixth PDCCH candidate associated with the at least one sixth AL, where the sixth PDCCH candidate is at least one of the plurality of first PDCCH candidates.

Optionally, in some embodiments of this application, an occasion at which the transceiver unit 420 sends the first DCI is earlier than an occasion at which the transceiver unit 420 sends the second DCI, or an occasion at which the second DCI is sent is earlier than an occasion at which the first DCI is sent.

Optionally, in some embodiments of this application, the first AL set and the second AL set each include at least one value, and the correspondence includes at least one of the following:

one first AL in the first AL set corresponds to one second AL in the second AL set, one first AL in the first AL set corresponds to a plurality of second ALs in the second AL set, a plurality of first ALs in the first AL set correspond to a plurality of second ALs in the second AL set, one second AL in the second AL set corresponds to one first AL in the first AL set, and one second AL in the second AL set corresponds to a plurality of first ALs in the first AL set.

Optionally, in some embodiments of this application, the first DCI is used to schedule first data, and the second DCI is used to schedule second data; and the first data and the second data are located on a same carrier or a same bandwidth part, and/or the first DCI and the DCI are located on a same carrier or a same bandwidth part.

Optionally, in some embodiments of this application, the transceiver unit 420 is configured to send configuration information. The configuration information includes at least one of the correspondence, a first search space set, a first control resource set, a second search space set, and a second control resource set. Configuration information of the first search space set includes indication information of the first AL set. Configuration information of the second search space set includes indication information of the second AL set. The first control resource set includes time-frequency resource configuration information of the plurality of first PDCCH candidates. The second control resource set includes time-frequency resource configuration information of the plurality of second PDCCH candidates.

Optionally, in some embodiments of this application, index values of the first control resource set and the second control resource set are different.

Optionally, in some embodiments of this application, a first transmit beam for sending the first DCI on the first control resource set is different from a second transmit beam for sending the second DCI on the second control resource set.

Optionally, in some embodiments of this application, the first AL set and/or the second AL set include/includes at least one of 1, 2, 4, 8, and 16.

Optionally, in some embodiments of this application, a first AL of the first DCI is the same as a first AL of the second DCI, an information bit length of the first DCI is the same as that of the second DCI, and the processing unit 410 is further configured to jointly encode the first DCI and the second DCI.

Optionally, in some embodiments of this application, a first AL of the first DCI is different from a first AL of the second DCI, and the processing unit 410 is further configured to separately encode the first DCI and the second DCI.

It should be understood that, for a specific process in which the units in the apparatus 400 perform the foregoing corresponding steps, refer to the descriptions related to the network device in the related embodiments of the method 100 with reference to FIG. 13 to FIG. 19. For brevity, details are not described herein again.

Optionally, the transceiver unit 420 may include a receiving unit (module) and a sending unit (module), configured to perform the steps of receiving information and sending information by the network device in the embodiments of the method 300 and the embodiments shown in FIG. 13 to FIG. 19. Optionally, the communications apparatus 400 may further include a storage unit 430, configured to store instructions to be executed by the processing unit 410 and the transceiver unit 420. The processing unit 410, the transceiver unit 420, and the storage unit 430 are in communication connection. The storage unit 430 stores instructions. The processing unit 410 is configured to execute the instructions stored in the storage unit 430. The transceiver unit 420 is configured to specifically send or receive a signal under driving by the processing unit 410.

It should be understood that the transceiver unit 420 may be a transceiver, an input/output interface, or an interface circuit. The storage unit 430 may be a memory. The processing unit 410 may be implemented by a processor. As shown in FIG. 22, a communications apparatus 500 may include a processor 510, a memory 520, and a transceiver 530.

Figure 23:
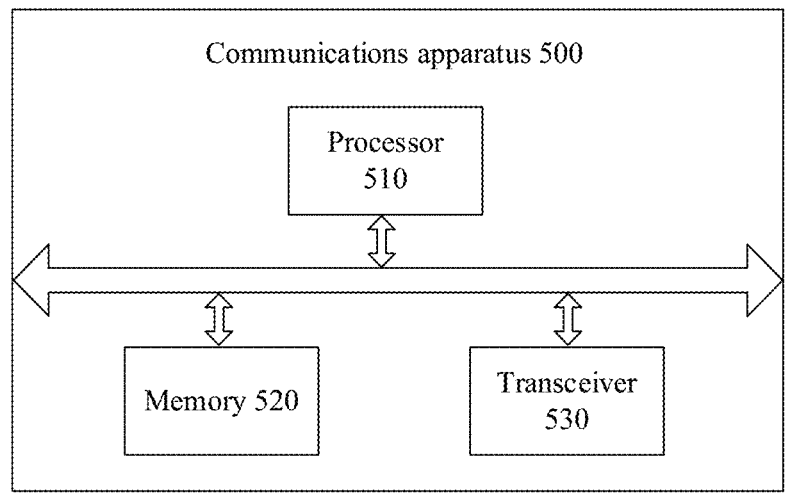
FIG. 23 is another schematic block diagram of a communications apparatus according to an embodiment of this application.

The communications apparatus 400 shown in FIG. 22 or the communications apparatus 500 shown in FIG. 23 is capable of implementing the steps performed by the network device in the embodiments of the method 100 and the embodiments shown in FIG. 13 to FIG. 19. For similar descriptions, refer to the descriptions in the foregoing corresponding methods. To avoid repetition, details are not described herein again.

It should be further understood that the communications apparatus 400 shown in FIG. 22 or the communications apparatus 500 shown in FIG. 23 may be a network device.

Figure 24:
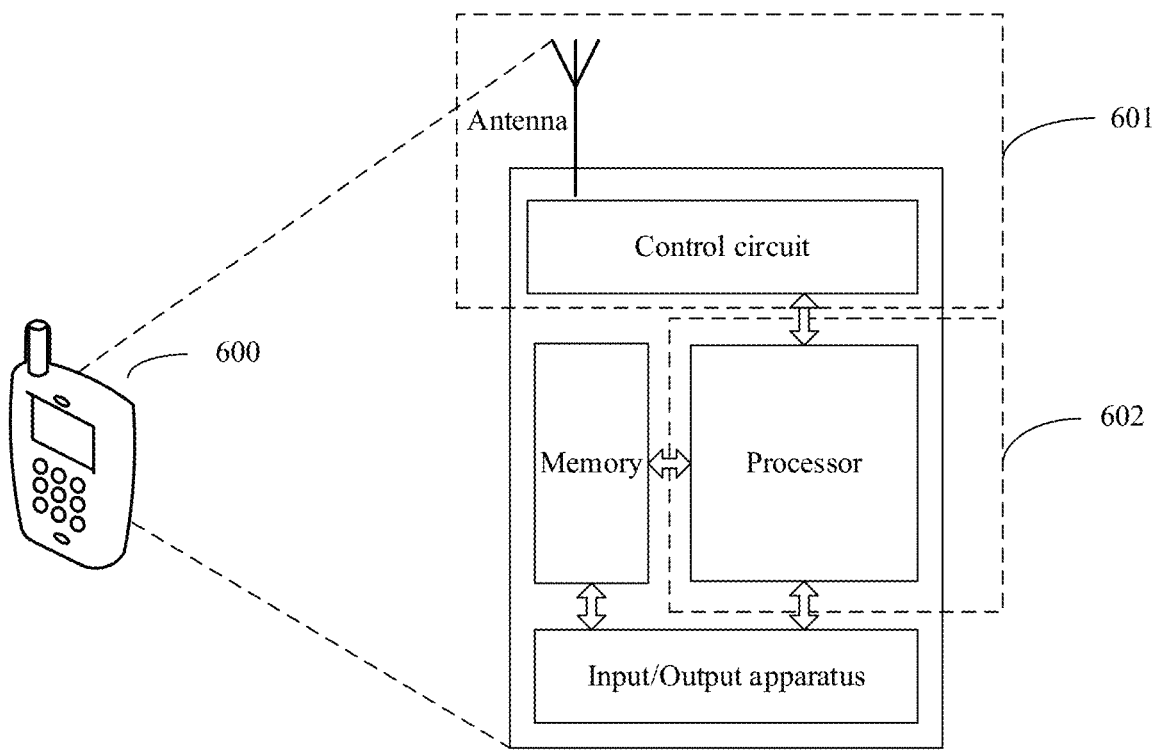
FIG. 24 is a schematic block diagram of a terminal device according to an embodiment of this application.

FIG. 24 is a schematic structural diagram of a terminal device 600 according to this application. The apparatus 200 or 300 may be configured in the terminal device 600, or the apparatus 200 or 300 may be the terminal device 600. In other words, the terminal device 600 may perform the actions performed by the terminal device in the method 100.

For ease of description, FIG. 24 shows only main components of the terminal device. As shown in FIG. 24, the terminal device 600 includes a processor, a memory, a control circuit, an antenna, and an input/output apparatus.

The processor is mainly configured to process a communication protocol and communication data, control the entire terminal device, execute a software program, and process data of the software program, for example, configured to support the terminal device in performing the actions described in the foregoing embodiments of the method for transmitting a precoding matrix indication. The memory is mainly configured to store the software program and the data, for example, store a codebook described in the foregoing embodiments. The control circuit is mainly configured to perform conversion between a baseband signal and a radio frequency signal, and process a radio frequency signal. The control circuit and the antenna may also be collectively referred to as a transceiver, mainly configured to send or receive a radio frequency signal in an electromagnetic wave form. The input/output apparatus, such as a touchscreen, a display screen, or a keyboard, is mainly configured to receive data entered by a user and output data to the user.

After the terminal device is powered on, the processor may read the software program in the storage unit, interpret and execute instructions of the software program, and process the data of the software program. When data needs to be sent wirelessly, the processor performs baseband processing on the to-be-sent data, and outputs a baseband signal to a radio frequency circuit. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art can understand that, for ease of description, FIG. 24 shows only one memory and one processor. In an actual terminal device, there may be a plurality of processors and memories. The memory may also be referred to as a storage medium, a storage device, or the like. This is not limited in this embodiment of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 24 integrates the functions of the baseband processor and the central processing unit. A person skilled in the art can understand that the baseband processor and the central processing unit may be alternatively processors independent of each other, and are interconnected by using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program, and the processor executes the software program to implement a baseband processing function.

For example, in this embodiment of this application, the antenna and the control circuit that have a transceiver function may be treated as a transceiver unit 601 of the terminal device 600, and the processor that has a processing function may be treated as a processing unit 602 of the terminal device 600. As shown in FIG. 24, the terminal device 600 includes the transceiver unit 601 and the processing unit 202. The transceiver unit may also be referred to as a transceiver, a transceiver device, a transceiver apparatus, or the like. Optionally, a device that is in the transceiver unit 601 and that is configured to implement a receiving function may be treated as a receiving unit, and a device that is in the transceiver unit 601 and that is configured to implement a sending function may be treated as a sending unit. In other words, the transceiver unit 601 ncludes the receiving unit and the sending unit. For example, the receiving unit may also be referred to as a receiving device, a receiver, a receiving circuit, or the like; and the sending unit may be referred to as a transmitting device, a transmitter, a transmitting circuit, or the like.

Figure 25:
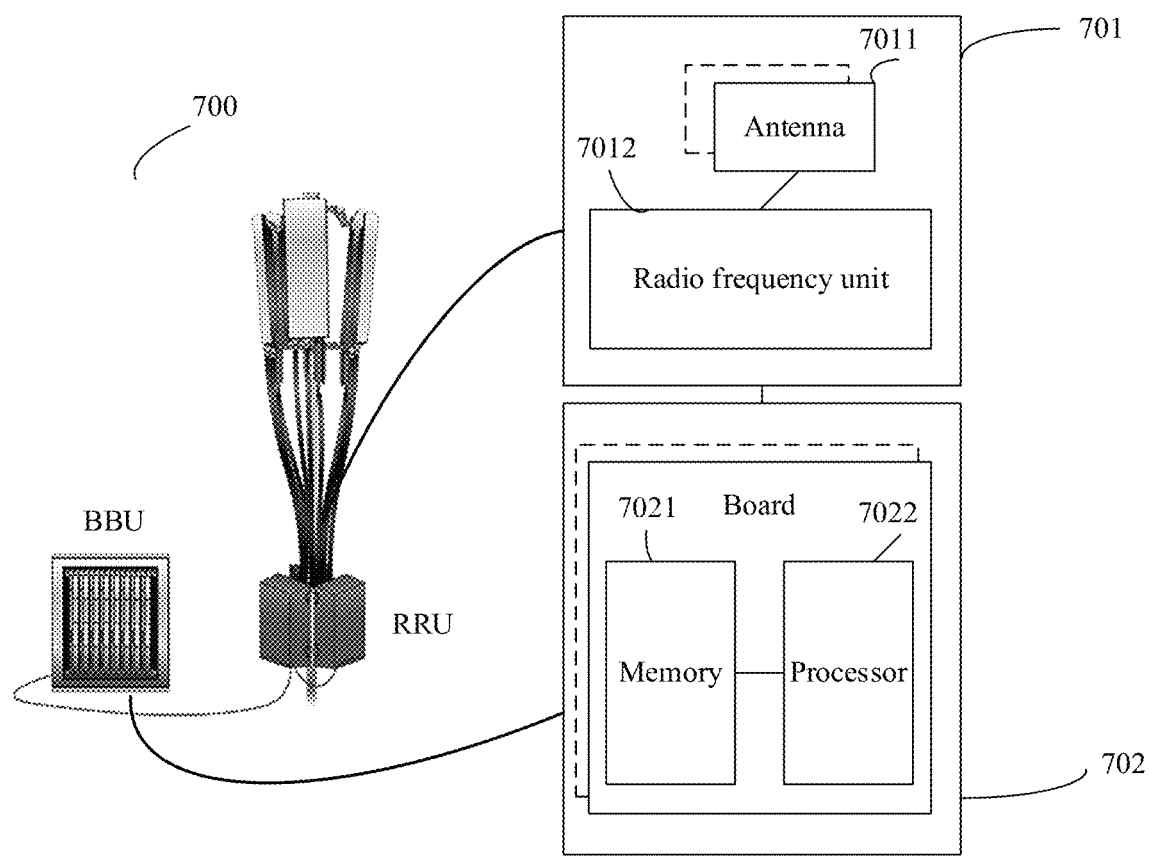
FIG. 25 is a schematic block diagram of a network device according to an embodiment of this application.

FIG. 25 is a schematic structural diagram of a network device 700 according to an embodiment of this application. The network device 700 may be configured to implement the functions of the network device in the foregoing method. The network device 700 includes one or more radio frequency units, for example, a remote radio unit (remote radio unit, RRU) 701 and one or more baseband units (baseband unit, BBU) (which may also be referred to as a digital unit (digital unit, DU)) 702. The RRU 701 may be referred to as a transceiver unit, a transceiver device, a transceiver circuit, a transceiver, or the like, and may include at least one antenna 7011 and a radio frequency unit 7012. The RRU 701 is mainly configured to send or receive a radio frequency signal, and perform conversion between a radio frequency signal and a baseband signal, for example, configured to send the signaling message in the foregoing embodiments to a terminal device. The BBU 702 is mainly configured to perform baseband processing, control a base station, and the like. The RRU 701 and the BBU 702 may be physically disposed together, or may be physically disposed separately, that is, a distributed base station.

The BBU 702 is a control center of the base station, may also be referred to as a processing unit, and is mainly configured to perform baseband processing functions such as channel coding, multiplexing, modulation, and spectrum spreading. For example, the BBU (processing unit) 702 may be configured to control the base station 70 to perform an operation procedure related to the network device in the foregoing method embodiments.

In an example, the BBU 702 may include one or more boards. A plurality of boards may jointly support a radio access network of a single access standard (for example, an LTE system or a 5G system), or may separately support radio access networks of different access standards. The BBU 702 further includes a memory 7021 and a processor 7022. The memory 7021 is configured to store necessary instructions and data. For example, the memory 7021 stores a codebook in the foregoing embodiments. For example, the processor 7022 is configured to control the base station to perform a necessary action, for example, configured to control the base station to perform an operation procedure related to the network device in the foregoing method embodiments. The memory 7021 and the processor 7022 may serve one or more boards. In other words, a memory and a processor may be separately disposed on each board, or a plurality of boards may share a same memory and a same processor. In addition, a necessary circuit may be further disposed on each board.

In a possible implementation, with development of a system-on-a-chip (system-on-chip, SoC) technology, all or some functions of the part 702 and the part 701 may be implemented by using the SoC technology, for example, by using a base station function chip. The base station function chip integrates devices such as a processor, a memory, and an antenna interface. A program of a related function of the base station is stored in the memory, and the processor executes the program to implement the related function of the base station. Optionally, the base station function chip can also read an external memory of the chip, to implement a related function of the base station.

It should be understood that the structure of the network device shown in FIG. 25 is merely a possible form, and should not be construed as any limitation on this embodiment of this application. This application does not exclude a possibility of a base station structure in another form that may appear in the future.

According to the method provided in the embodiments of this application, an embodiment of this application further provides a communications system, including the foregoing network device and one or more terminal devices.

It should be understood that, the processor in the embodiments of this application may be a central processing unit (CPU), or may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor, or the processor may be any conventional processor or the like.

It may be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories (RAM) may be used, for example, a static random access memory (SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions or computer programs. When the program instructions or the computer programs are loaded and executed on a computer, all or some of the procedures or functions according to the embodiments of this application are generated. The computer may be a general purpose computer, a special purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a communications system. The communications system includes the terminal device and the network device.

An embodiment of this application further provides a computer-readable medium, configured to store computer program code. The computer program includes instructions used to perform the information transmission method in the embodiments of this application in the method 100. The readable medium may be a read-only memory (read-only memory, ROM) or a random access memory (random access memory, RAM). This is not limited in this embodiment of this application.

This application further provides a computer program product. The computer program product includes instructions. When the instructions are executed, a first terminal device, a second terminal device, and a network device are enabled to perform the operations corresponding to the terminal device and the network device in the foregoing method.

An embodiment of this application further provides a system chip. The system chip includes a processing unit and a communications unit. For example, the processing unit may be a processor, and the communications unit may be an input/output interface, a pin, or a circuit. The processing unit may execute computer instructions, so that a chip in the communications apparatus performs any information transmission method provided in the embodiments of this application.

Optionally, any communications apparatus provided in the embodiments of this application may include the system chip.

Optionally, the computer instructions are stored in a storage unit.

Optionally, the storage unit is a storage unit in the chip, for example, a register or a cache. Alternatively, the storage unit may be a storage unit that is in a terminal and that is located outside the chip, for example, a ROM, another type of static storage device that can store static information and instructions, or a RAM. Any aforementioned processor may be a CPU, a microprocessor, an ASIC, or one or more integrated circuits configured to control execution of a program for the foregoing feedback information transmission method. The processing unit and the storage unit may be decoupled, separately disposed on different physical devices, and connected in a wired or wireless manner to implement functions of the processing unit and the storage unit respectively, to support the system chip in implementing various functions in the foregoing embodiments. Alternatively, the processing unit and the memory may be coupled on one device.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memories (random access memory, RAM) may be used, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The terms "uplink" and "downlink" in this application are used to describe a data/information transmission direction in a specific scenario. For example, an "uplink" direction is usually a direction in which data/information is transmitted from a terminal to a network side, or a direction in which data/information is transmitted from a distributed unit to a central unit; and a "downlink" direction is usually a direction in which data/information is transmitted from a network side to a terminal, or a direction in which data/information is transmitted from a central unit to a distributed unit. It can be understood that "uplink" and "downlink" are merely used to describe a data/information transmission direction, without limiting a specific starting or ending device of data/information transmission.

In this application, names may be assigned to various objects such as messages, information, devices, network elements, systems, apparatuses, actions, operations, procedures, and concepts. It can be understood that the specific names do not constitute a limitation on the related objects. The assigned names may vary with factors such as scenarios, contexts, or usage habits. Understanding of technical meanings of technical terms in this application should be determined mainly based on functions and technical effects embodied or performed by the technical terms in the technical solutions.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to a current technology, or the part of the technical solutions may be implemented in the form of a software product. The software product is stored in a storage medium and includes several instructions for instructing a computer device (which may include a personal computer, a server, or a network device) to perform all or some of the steps of the methods described in the embodiments of this application. The storage medium includes a USB flash drive, a removable hard disk, a read-only memory (read-only memory, ROM), or a random access memory.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A method, comprising:
   determining a correspondence between a first aggregation level (AL) set associated with a plurality of first physical downlink control channel (PDCCH) candidates for receiving a first DCI and a second AL set associated with a plurality of second PDCCH candidates for receiving a second DCI, wherein the correspondence is a correspondence between at least one first AL in the first AL set and at least one second AL in the second AL set; and the first DCI and the second DCI are same DCI;
   monitoring, based on the correspondence, at least one first PDCCH candidate to receive the first DCI from a first transmission reception point (TRP) and at least one second PDCCH candidate to receive the second DCI from a second TRP.

2. The method according to claim 1, wherein a first AL of the first DCI is the same as a second AL of the second DCI.

3. The method according to claim 1, wherein the method further comprises jointly decoding the first DCI and the second DCI.

4. The method according to claim 1, wherein the first DCI is carried on a first time-frequency resource set, the second DCI is carried on a second time-frequency resource set, and the monitoring, based on the correspondence, at least one first PDCCH candidate and at least one second PDCCH candidate comprises:
monitoring the first DCI on the first time-frequency resource set, and monitoring the second DCI on the second time-frequency resource set; wherein the first time-frequency resource set and the second time-frequency resource set are located on a same carrier.

5. The method according to claim 4, wherein the method further comprises: receiving configuration information; wherein the configuration information comprises at least one of the following:
the correspondence, configuration information of a first search space set, configuration information of a first control resource set, configuration information of a second search space set, or configuration information of a second control resource set;
wherein the configuration information of the first search space set comprises indication information of the first AL set, and the configuration information of the second search space set comprises indication information of the second AL set, and the configuration information of first control resource set comprises time-frequency resource configuration information of the plurality of first PDCCH candidates, and the configuration information of second control resource set comprises time-frequency resource configuration information of the plurality of second PDCCH candidates.

6. The method according to claim 5, wherein an index value of the first control resource set is different from an index value of the second control resource set.

7. The method according to claim 5, wherein a first receive beam for receiving the first DCI on the first control resource set is different from a second receive beam for receiving the second DCI on the second control resource set.

8. The method according to claim 1, wherein
the first AL set comprises at least one of the following aggregation levels: 1, 2, 4, 8, or 16; and/or
the second AL set comprises at least one of the following aggregation levels: 1, 2, 4, 8, or 16.

9. A method, comprising:
determining a correspondence between a first aggregation level (AL) set associated with a plurality of first physical downlink control channel (PDCCH) candidates and a second AL set associated with a plurality of second PDCCH candidates; and
based on the correspondence, sending the following:
first downlink control information (DCI) on at least one first PDCCH candidate, wherein the first DCI is from a first transmission reception point (TRP); and
second DCI on at least one second PDCCH candidate, wherein the second DCI is from a second TRP;
wherein the first DCI and the second DCI are same DCI.

10. The transmission method of claim 9, wherein a first AL of the first DCI is the same as a second AL of the second DCI.

11. The transmission method of claim 9, wherein the first DCI is carried on a first time-frequency resource set and the second DCI is carried on a second time-frequency resource set, and wherein the first time-frequency resource set and the second time-frequency resource set are located on a same carrier.

12. The transmission method of claim 11, further comprising:
sending configuration information;
wherein the configuration information comprises at least one of the following:
the correspondence, configuration information of a first search space set, configuration information of a first control resource set, configuration information of a second search space set, or configuration information of a second control resource set; and
wherein the configuration information of the first search space set comprises indication information of the first AL set, and the configuration information of the second search space set comprises indication information of the second AL set, and the configuration information of first control resource set comprises time-frequency resource configuration information of the plurality of first PDCCH candidates, and the configuration information of second control resource set comprises time-frequency resource configuration information of the plurality of second PDCCH candidates.

13. The transmission method of claim 12, wherein an index value of the first control resource set is different from an index value of the second control resource set.

14. An apparatus, comprising:
at least one processor and a transceiver;
wherein the at least one processor is configured to:
determine a correspondence between a first aggregation level (AL) set associated with a plurality of first physical downlink control channel (PDCCH) candidates for receiving a first DCI and a second AL set associated with a plurality of second PDCCH candidates for receiving a second DCI, wherein the correspondence is a correspondence between at least one first AL in the first AL set and at least one second AL in the second AL set; and the first DCI and the second DCI are same DCI;
monitor, based on the correspondence, at least one first PDCCH candidate to receive the first DCI from a first transmission reception point (TRP) and at least one second PDCCH candidate to receive the second DCI from a second TRP.

15. The apparatus according to claim 14, wherein a first AL of the first DCI is the same as a second AL of the second DCI.

16. The apparatus according to claim 14, wherein the at least one processor is further configured to jointly decode the first DCI and the second DCI.

17. The apparatus according to claim 14, wherein a first control resource set comprises time-frequency resources of the plurality of first PDCCH candidates and a second control resource set comprises time-frequency resources of the plurality of second PDCCH candidates, and an index value of the first control resource set is different from an index value of the second control resource set.

18. An apparatus, comprising:
at least one processor and a transceiver;
wherein the at least one processor is configured to:
determine a correspondence between a first aggregation level (AL) set associated with a plurality of first physical downlink control channel (PDCCH) candidates and a second AL set associated with a plurality of second PDCCH candidates; and
based on the correspondence, send the following:

first downlink control information (DCI) on at least one first PDCCH candidate, wherein the first DCI is from a first transmission reception point (TRP); and second DCI on at least one second PDCCH candidate, wherein the second DCI is from a second TRP;

wherein the first DCI and the second DCI are same DCI.

19. The apparatus of claim 18, wherein a first AL of the first DCI is the same as a second AL of the second DCI.

20. The apparatus according to claim 18, wherein a first control resource set comprises time-frequency resources of the plurality of first PDCCH candidates and a second control resource set comprises time-frequency resources of the plurality of second PDCCH candidates, and an index value of the first control resource set is different from an index value of the second control resource set.

* * * * *